United States Patent
Takizawa

(10) Patent No.: US 10,120,061 B2
(45) Date of Patent: Nov. 6, 2018

(54) POSITION DETECTION SYSTEM AND POSITION DETECTION METHOD

(71) Applicant: Murata Manufacturing Co., Ltd., Kyoto (JP)

(72) Inventor: Koichi Takizawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/801,723

(22) Filed: Nov. 2, 2017

(65) Prior Publication Data

US 2018/0143288 A1 May 24, 2018

Related U.S. Application Data

(63) Continuation of application No. PCT/JP2016/062897, filed on Apr. 25, 2016.

(30) Foreign Application Priority Data

May 7, 2015 (JP) .................................. 2015-095115

(51) Int. Cl.
*G01S 5/06* (2006.01)
*G01S 5/14* (2006.01)
(Continued)

(52) U.S. Cl.
CPC .............. *G01S 5/06* (2013.01); *G01S 5/0036* (2013.01); *G01S 5/021* (2013.01); *G01S 5/0221* (2013.01);
(Continued)

(58) Field of Classification Search
CPC ..... H04W 56/00; H04W 56/001; H04W 4/02; G01S 5/06
See application file for complete search history.

(56) References Cited

U.S. PATENT DOCUMENTS

| 5,045,861 A | 9/1991 | Duffett-Smith |
| 2008/0204322 A1* | 8/2008 | Oswald ................ G01S 5/04 342/465 |

(Continued)

FOREIGN PATENT DOCUMENTS

| JP | 2007-518968 A | 7/2007 |
| JP | 2009-133649 A | 6/2009 |
| JP | 2011-117879 A | 6/2011 |

OTHER PUBLICATIONS

International Search Report Issued in Patent Application No. PCT/JP2016/062897 dated May 31, 2016.
(Continued)

*Primary Examiner* — Kamran Afshar
*Assistant Examiner* — Farideh Madani
(74) *Attorney, Agent, or Firm* — Pearne & Gordon LLP

(57) ABSTRACT

A mobile station transmits a first radio signal, a reference station transmits a second radio signal. Fixed stations extract phase differences ($\Delta\varphi mf1$) to ($\Delta\varphi mf3$), respectively, between a carrier included in the first radio signal and reference clocks of the respective fixed stations. The fixed stations extract phase differences ($\Delta\varphi sf1$) to ($\Delta\varphi sf3$), respectively, between a carrier included in the second radio signal and the reference clocks of the respective fixed stations. A server cancels phase offsets ($\varphi f1$) to ($\varphi f3$) of the respective fixed stations using phase difference information between the mobile station and each of the fixed stations and phase difference information between the reference station and each of the fixed stations, obtains distance information between each of the fixed stations and the mobile station, and calculates a position of the mobile station.

14 Claims, 15 Drawing Sheets

(51) Int. Cl.
  *G01S 5/00* (2006.01)
  *G01S 5/02* (2010.01)
  *H04W 64/00* (2009.01)
  *H04W 4/02* (2018.01)
(52) U.S. Cl.
  CPC .............. *G01S 5/0252* (2013.01); *G01S 5/14* (2013.01); *H04W 4/02* (2013.01); *H04W 64/00* (2013.01)

(56) References Cited

U.S. PATENT DOCUMENTS

| 2012/0122485 A1* | 5/2012 | Bartlett | G01S 5/0284 |
| | | | 455/456.1 |
| 2015/0141034 A1* | 5/2015 | Ekbatani | H04L 25/0204 |
| | | | 455/456.1 |

OTHER PUBLICATIONS

Written Opinion Issued in Patent Application No. PCT/JP2016/062897 dated May 31, 2016.
"Technical Specification Group Radio Access Network; Evolved Universal Terrestrial Radio Access Network (E-Tran) Stage 2 functional specification of User Equipment (UE) positioning in E-UTRAN (Release 12)" 3rd Generation Partnership Project (3GPP TS 36.305) V12.2.0, 2014, pp. 1-59, 3GPP Organizational Partners, Valbonne, France.

* cited by examiner

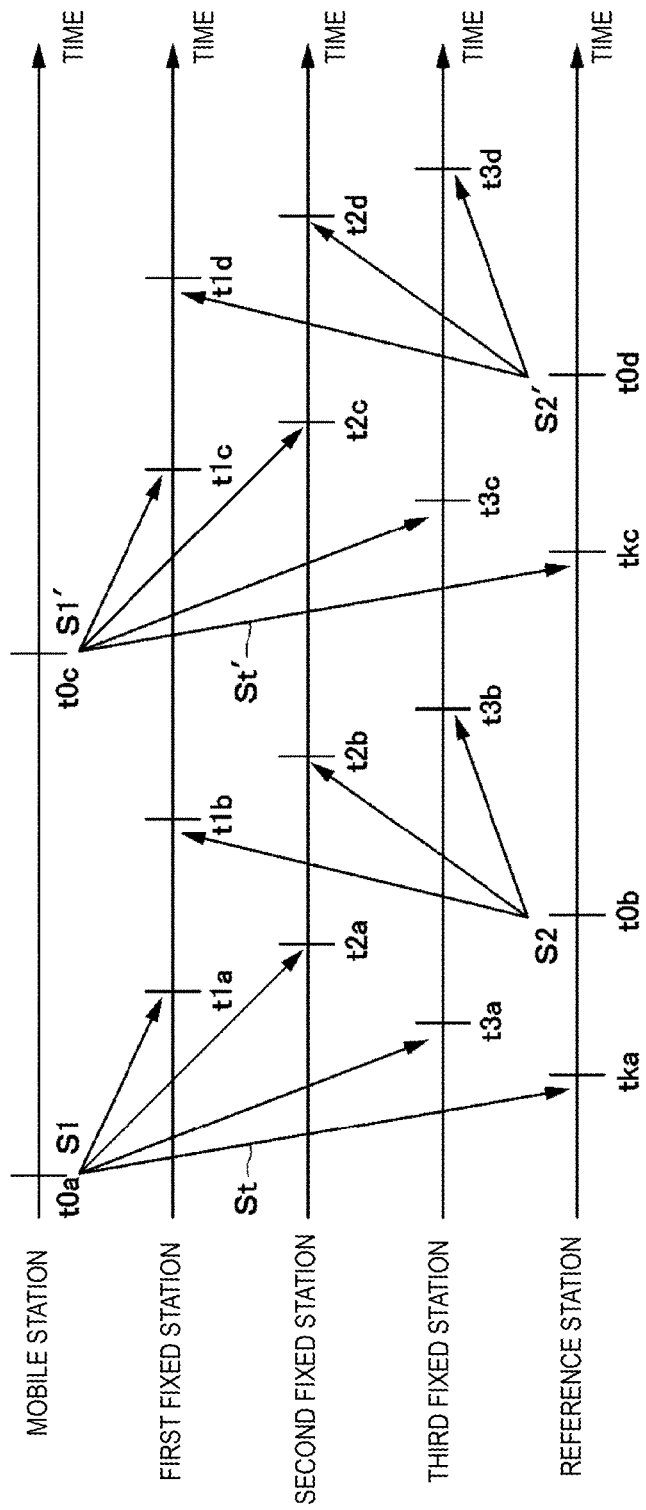

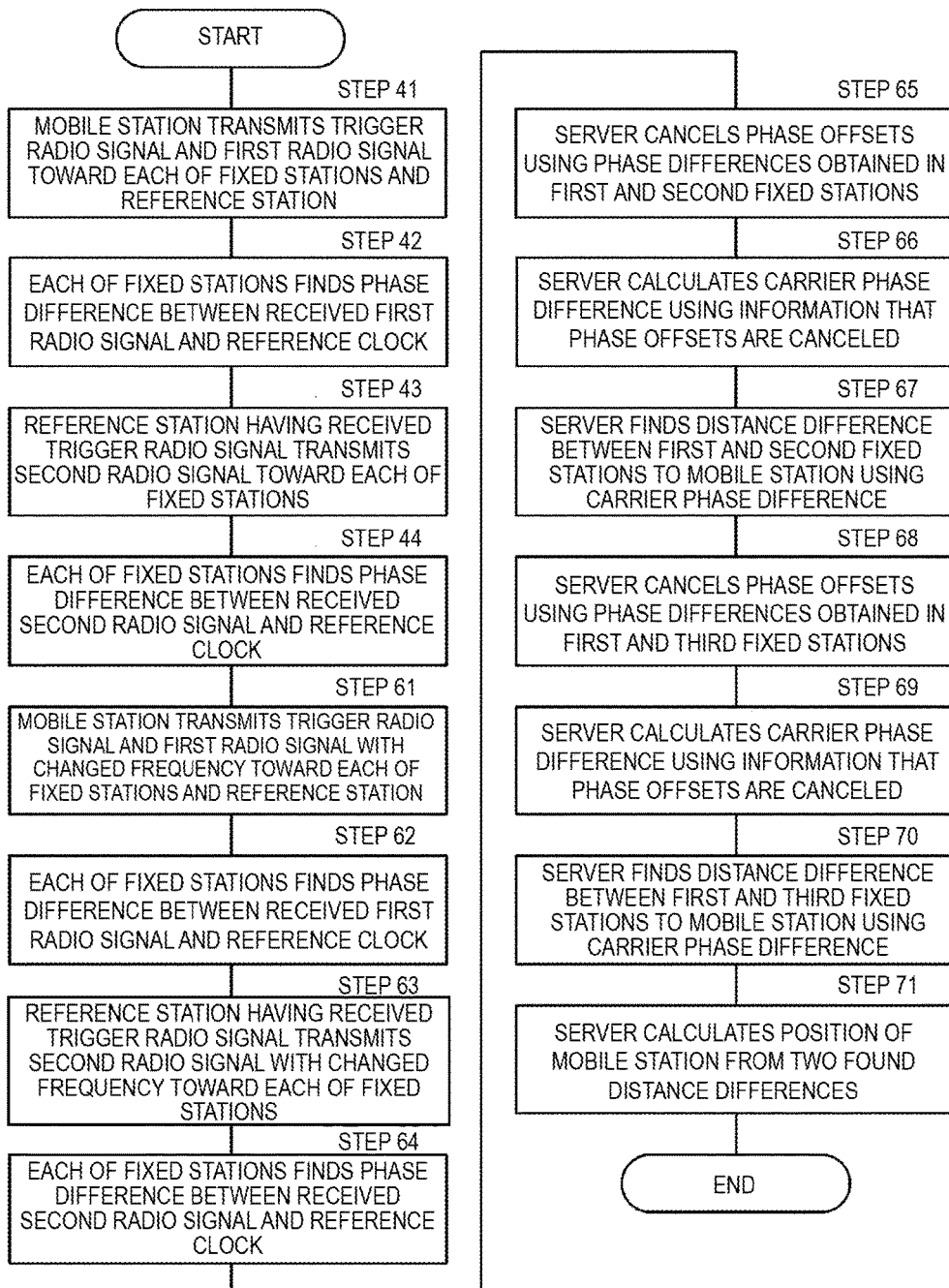

POSITION DETECTION SYSTEM AND POSITION DETECTION METHOD

This is a continuation of International Application No. PCT/JP2016/062897 filed on Apr. 25, 2016 which claims priority from Japanese Patent Application No. 2015-095115 filed on May 7, 2015. The contents of these applications are incorporated herein by reference in their entireties.

BACKGROUND OF THE DISCLOSURE

Field of the Disclosure

The present disclosure relates to a position detection system and a position detection method for detecting a position of a mobile station.

Description of the Related Art

A position detection system which has a plurality of fixed stations (base stations) and a mobile station, the plurality of fixed stations receiving a pulse signal transmitted by the mobile station, and calculates a positional relationship between the fixed stations and the mobile station from a difference of reception times has generally been known.

Additionally, a position specification device configured by a reference station, a relay station, and a mobile terminal has been known (for example, see Patent Document 1).

Patent Document 1: Japanese Unexamined Patent Application Publication No. 2011-117879

BRIEF SUMMARY OF THE DISCLOSURE

Incidentally, in a position detection system using a pulse signal, in order to measure a reception time of the pulse signal, it is necessary for a pulse width to be shortened for enhancing measurement resolution and times of respective fixed stations to be synchronized with high accuracy. However, if the pulse width is shortened, an occupied band width broadens, and furthermore there is a problem that complicated processing is necessary for synchronizing the fixed stations with high accuracy.

Additionally, a position specification device disclosed in Patent Document 1 is configured so as to detect a phase of a distance measurement signal and a phase of a direction measurement signal transmitted from a reference station and a relay station, and specify a position of a mobile terminal moving along a long side of a rectangular service area. However, since it is necessary for this position specification device to control antenna directivity of the reference station and the relay station in order to measure the direction, there is a problem of complicated processing. Additionally, the range in which the position of the mobile terminal can be specified is limited to a rectangular shape, and there is thus a problem that a place or a condition which can be used is limited.

The present disclosure has been made in view of the above-described problems of the existing techniques, and an object of the present disclosure is to provide a position detection system and a position detection method which can simplify a system in an asynchronism manner.

(1). In order to solve the above-described problems, a position detection system according to the present disclosure includes: a mobile station having a mobile station reference clock circuit, a radio signal transmission circuit, and a transmission antenna; a reference station having a reference station reference clock circuit, a radio signal transmission circuit, and a transmission antenna; and at least three or more fixed stations each having a fixed station reference clock circuit, a radio signal reception circuit, and a reception antenna, in which the fixed station reference clock circuits of the three or more fixed stations each asynchronously and independently operate and generate reference clocks with the same frequency as one another, the mobile station intermittently transmits a first radio signal based on a reference clock of the mobile station reference clock circuit, the reference station is disposed at a predetermined position and intermittently transmits a second radio signal based on a reference clock of the reference station reference clock circuit, each of the fixed stations receives the first radio signal and extracts a phase difference between a carrier included in the first radio signal and each of the reference clocks of each of the fixed stations, receives the second radio signal and extracts a phase difference between a carrier included in the second radio signal and each of the reference clocks of each of the fixed stations, a phase offset of the reference clock of each of the fixed stations is canceled using phase difference information between the mobile station and each of the fixed stations and phase difference information between the reference station and each of the fixed stations, distance information between each of the fixed stations and the mobile station is obtained, and a position of the mobile station is calculated.

According to the present disclosure, the configuration is such that the position of the mobile station is calculated using the phase difference information between the mobile station and each of the fixed stations and the phase difference information between the reference station and each of the fixed stations. In this case, since a phase shift (difference) of the radio signal reaching each of the fixed stations is used, distance resolution shorter than a wave length of the radio signal can be realized. With this configuration, even when detecting the position of the mobile station with enhanced distance resolution, a narrowband radio signal can be used, and it is thus possible to narrow an occupied band width of the radio signal in comparison with a case where a pulse signal is used.

Additionally, using the phase difference information between the mobile station and each of the fixed stations and the phase difference information between the reference station and each of the fixed stations, the phase offset of each of the reference clocks of the mobile station, the reference station, and each of the fixed stations is canceled. With this configuration, it is not necessary to synchronize each of the fixed stations, the mobile station, and the reference station, and thus a system construction can be simplified.

(2). The position detection system according to the present disclosure is configured such that the mobile station transmits a trigger radio signal in order for the reference station to transmit the second radio signal, the reference station has a radio signal reception circuit and a reception antenna, and the reference station transmits the second radio signal when receiving the trigger radio signal transmitted by the mobile station.

According to the present disclosure, the configuration is such that the mobile station transmits the trigger radio signal, and the reference station transmits the second radio signal upon receiving the trigger radio signal transmitted by the mobile station. This makes it possible to shorten a gap between a time when each of the fixed stations receives the first radio signal from the mobile station and a time when each of the fixed stations receives the second radio signal from the reference station. As a result, phase rotation by frequency deviation of each of the fixed stations can be suppressed to be small, and it is thus possible to enhance accuracy of a phase correction and realize highly accurate position detection.

(3). The position detection system according to the present disclosure is configured such that at least one of the mobile station reference clock circuit of the mobile station and the reference station reference clock circuit of the reference station generates a reference clock with the same frequency as that of each of the fixed station reference clock circuits of each of the fixed stations.

According to the present disclosure, the configuration is such that at least one of the mobile station reference clock circuit and the reference station reference clock circuit generates the reference clock with the same frequency as that of each of the fixed station reference clock circuits. In this case, since a carrier frequency of the first or second radio signal and a frequency of the reference clock of each of the fixed stations are the same, even when a phase detection timing shifts, a phase difference between the carrier of the first or second radio signal and the reference clock of each of the fixed stations does not almost change. Accordingly, measurement variation decreases, and it is thus possible to realize highly accurate position detection.

In other words, when the carrier frequency and the frequency of the reference clock of each of the fixed stations are the same, by calculating a difference between a carrier phase of the first or second radio signal and a reference clock phase of each of the fixed stations, a shift of the phase detection timing can be canceled out. As a result, a configuration can be made in which the phase difference between the carrier phase of the first or second radio signal and the reference clock phase of each of the fixed stations does not depend on a measurement time, and it is thus possible to suppress variation in the measurement, and calculate the position of the mobile station with high accuracy.

(4). The position detection system according to the present disclosure is configured such that the mobile station transmits the trigger radio signal and the first radio signal with a predetermined time gap.

According to the present disclosure, the configuration is such that the mobile station transmits the trigger radio signal and the first radio signal with the predetermined time gap. In this case, the mobile station can transmit the first radio signal without receiving the second radio signal from the reference station which has received the trigger radio signal. This makes it possible to shorten a gap between a time when each of the fixed stations receives the first radio signal from the mobile station and a time when each of the fixed stations receives the second radio signal from the reference station. As a result, phase rotation by frequency deviation of each of the fixed stations can be suppressed to be small, and it is thus possible to enhance accuracy of a phase correction and realize highly accurate position detection.

(5). The position detection system according to the present disclosure is configured such that at least one fixed station of the three or more fixed stations also includes a function of the reference station and transmits the second radio signal.

According to the present disclosure, the configuration is such that the at least one fixed station also includes the function of the reference station and transmits the second radio signal. In this case, using the second radio signal transmitted from the fixed station, the phase offset of each of the fixed stations can be canceled, and it is therefore not necessary for the reference station to be separately provided. As a result, the system can be simply constructed, and thus a cost can be suppressed.

(6). The position detection system according to the present disclosure is configured such that the mobile station reference clock circuit of the mobile station has a function of generating reference clocks with two or more frequencies, and the mobile station transmits the first radio signals with two or more types of carrier frequencies.

According to the present disclosure, the configuration is such that the mobile station reference clock circuit has the function for generating the reference clocks with two or more frequencies, and the mobile station transmits the first radio signals with two or more types of carrier frequencies. In this case, since a phase difference detected using one carrier frequency and a phase difference detected using another carrier frequency each have a different repetition period from each other, it is possible to find how many times the two phase differences cycle using a difference between the two phase differences. With this, periodicity of the phase difference becomes long, uncertainty with respect to the phase is eliminated and an absolute phase can be found, and it is thus possible to calculate the position of the mobile station with high accuracy.

(7). The position detection system according to the present disclosure is configured such that the reference station transmits the second radio signals with two or more types of carrier frequencies which are the same as those of the mobile station.

According to the present disclosure, the configuration is such that the reference station transmits the second radio signals with the two or more types of carrier frequencies which are the same as those of the mobile station. With this configuration, by using a carrier phase difference between the two carrier frequencies, periodicity of the phase difference becomes long, a distance difference between the mobile station and each of the fixed stations can be uniquely found. Additionally, performing a phase correction using the first radio signals with two or more types of carrier frequencies by the mobile station and the second radio signals with two or more types of carrier frequencies by the reference station makes it possible to enhance accuracy of the phase correction and calculate the position of the mobile station with high accuracy.

(8). A position detection method according to the present disclosure uses a position detection system which includes: a mobile station having a mobile station reference clock circuit, a radio signal transmission circuit, and a transmission antenna; a reference station having a reference station reference clock circuit, a radio signal transmission circuit, and a transmission antenna; and at least three or more fixed stations each having a fixed station reference clock circuit, a radio signal reception circuit, and a reception antenna, in which the fixed station reference clock circuits of the three or more fixed stations each asynchronously and independently operate and generate reference clocks with the same frequency as one another, the mobile station intermittently transmits a first radio signal based on a reference clock of the mobile station reference clock circuit, the reference station is disposed at a predetermined position and intermittently transmits a second radio signal based on a reference clock of the reference station reference clock circuit, each of the fixed stations receives the first radio signal and extracts a phase difference between a carrier included in the first radio signal and each of the reference clocks of each of the fixed stations, receives the second radio signal and extracts a phase difference between a carrier included in the second radio signal and each of the reference clocks of each of the fixed stations, a phase offset of the reference clock of each of the fixed stations is canceled using phase difference information between the mobile station and each of the fixed stations and phase difference information between the reference station and each of the fixed stations, distance information between each of the fixed stations and the mobile station is obtained, and a position of the mobile station is calculated.

According to the present disclosure, the configuration is such that the position of the mobile station is calculated using the phase difference information between the mobile station and each of the fixed stations and the phase difference information between the reference station and each of the fixed stations. In this case, since a phase shift (difference) of the radio signal reaching each of the fixed stations is used, distance resolution shorter than a wave length of the radio signal can be realized. With this configuration, even when detecting the position of the mobile station with enhanced distance resolution, a narrowband radio signal can be used, and it is thus possible to narrow an occupied band width of the radio signal in comparison with a case where a pulse signal is used.

Additionally, using the phase difference information between the mobile station and each of the fixed stations and the phase difference information between the reference station and each of the fixed stations, the phase offset of each of the reference clocks of the mobile station, the reference station, and each of the fixed stations is canceled. With this configuration, it is not necessary to synchronize each of the fixed stations, the mobile station, and the reference station, and thus a system construction can be simplified.

(9). The position detection method according to the present disclosure is configured such that the mobile station transmits a trigger radio signal in order for the reference station to transmit the second radio signal, the reference station has a radio signal reception circuit and a reception antenna, and the reference station transmits the second radio signal when receiving the trigger radio signal transmitted by the mobile station.

This makes it possible to shorten a gap between a time when each of the fixed stations receives the first radio signal from the mobile station and a time when each of the fixed stations receives the second radio signal from the reference station. As a result, phase rotation by frequency deviation of each of the fixed stations can be suppressed to be small, and it is thus possible to enhance accuracy of a phase correction and realize highly accurate position detection.

(10). The position detection method according to the present disclosure is configured such that at least one of the mobile station reference clock circuit of the mobile station and the reference station reference clock circuit of the reference station generates a reference clock with the same frequency as that of each of the fixed station reference clock circuits of each of the fixed stations.

In this case, since a carrier frequency of the first or second radio signal and a frequency of the reference clock of each of the fixed stations are the same, even when a phase detection timing shifts, a phase difference between the carrier of the first or second radio signal and the reference clock of each of the fixed stations does not almost change. Accordingly, measurement variation decreases, and it is thus possible to realize highly accurate position detection.

(11). The position detection method according to the present disclosure is configured such that the mobile station transmits the trigger radio signal and the first radio signal with a predetermined time gap.

In this case, the mobile station can transmit the first radio signal without receiving the second radio signal from the reference station which has received the trigger radio signal. This makes it possible to shorten a gap between a time when each of the fixed stations receives the first radio signal from the mobile station and a time when each of the fixed stations receives the second radio signal from the reference station. As a result, phase rotation by frequency deviation of each of the fixed stations can be suppressed to be small, and it is thus possible to enhance accuracy of a phase correction and realize highly accurate position detection.

(12). The position detection method according to the present disclosure is configured such that at least one fixed station of the three or more fixed stations also includes a function of the reference station and transmits the second radio signal.

In this case, using the second radio signal transmitted from the fixed station, the phase offset of each of the fixed stations can be canceled, it is therefore not necessary for the reference station to be separately provided. As a result, the system can be simply constructed, and thus a cost can be suppressed.

(13). The position detection method according to the present disclosure is configured such that the mobile station reference clock circuit of the mobile station has a function of generating reference clocks with two or more frequencies, and the mobile station transmits the first radio signals with two or more types of carrier frequencies.

In this case, since a phase difference detected using one carrier frequency and a phase difference detected using another carrier frequency each have a different repetition period from each other, it is possible to find how many times the two phase differences cycle using a difference between the two phase differences. With this, periodicity of the phase difference becomes long, uncertainty with respect to the phase is eliminated and an absolute phase can be found, and it is thus possible to calculate the position of the mobile station with high accuracy.

(14). The position detection method according to the present disclosure is configured such that the reference station transmits the second radio signals with two or more types of carrier frequencies which are the same as those of the mobile station.

With this configuration, by using a carrier phase difference between the two carrier frequencies, periodicity of the phase difference becomes long, a distance difference between the mobile station and each of the fixed stations can be uniquely found. Additionally, performing a phase correction using the first radio signals with two or more types of carrier frequencies by the mobile station and the second radio signals with two or more types of carrier frequencies by the reference station makes it possible to enhance accuracy of the phase correction and calculate the position of the mobile station with high accuracy.

BRIEF DESCRIPTION OF THE SEVERAL VIEWS OF THE DRAWINGS

FIG. 21 is a descriptive diagram illustrating a transmission and reception timing of a radio signal by the position detection system according to the seventh embodiment.

FIG. 22 is a flowchart illustrating an overall processing of the position detection system according to the seventh embodiment.

DETAILED DESCRIPTION OF THE DISCLOSURE

Figure 1:
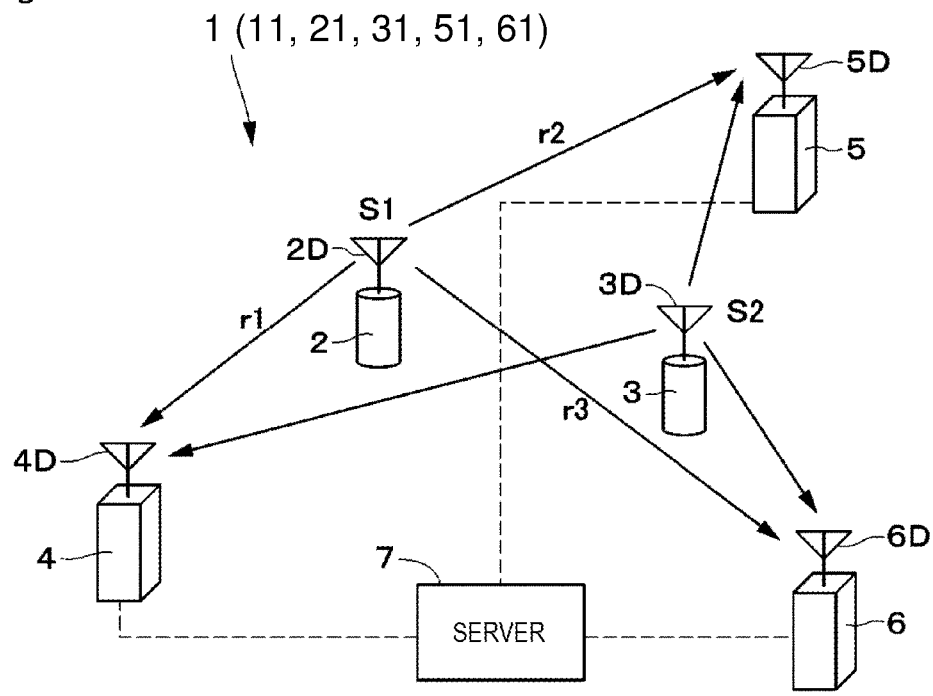
FIG. 1 is a block diagram illustrating the overall configuration of a position detection system according to first to fourth, sixth, and seventh embodiments.

Hereinafter, position detection systems according to embodiments of the present disclosure will be described in detail with reference to the accompanying drawings.

FIG. 1 to FIG. 9 illustrate a position detection system 1 according to a first embodiment. The position detection system 1 is configured by including a mobile station 2, a reference station 3, a first fixed station 4, a second fixed station 5, a third fixed station 6, a server 7, and the like. In this case, for example, it is assumed that the mobile station 2 and the first fixed station 4 are distanced from each other by a distance r1, the mobile station 2 and the second fixed station 5 are distanced from each other by a distance r2, and the mobile station 2 and the third fixed station 6 are distanced from each other by a distance r3.

Figure 2:
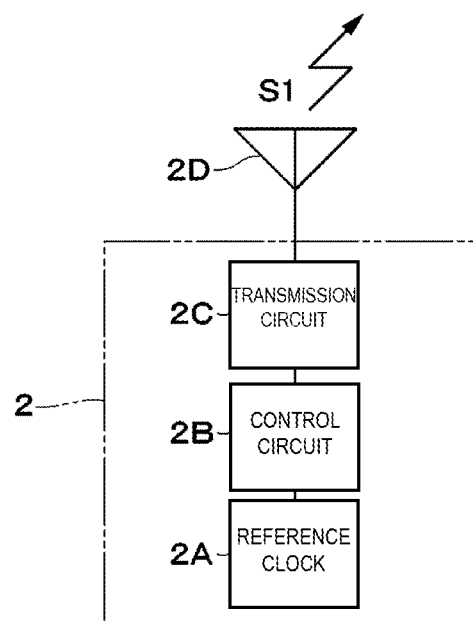
FIG. 2 is a block diagram illustrating the overall configuration of a mobile station in FIG. 1.

The mobile station 2 is, for example, a movable radio terminal to be a detection target. As illustrated in FIG. 2, the mobile station 2 is configured by including a mobile station reference clock circuit 2A, a control circuit 2B, a radio signal transmission circuit 2C, a transmission antenna 2D, and the like. This mobile station 2 transmits a first radio signal S1 toward each of the fixed stations 4 to 6.

The mobile station reference clock circuit 2A is, for example, configured by including an oscillator, generates a reference clock (CLK) Cm with an angular frequency $\omega m$ (carrier frequency) to be a reference of the first radio signal S1 for the transmission antenna 2D. The control circuit 2B is, for example, configured by a microcomputer or the like, controls the timing or the like by which the mobile station 2 intermittently transmits the first radio signal S1.

The radio signal transmission circuit 2C includes, for example, a modulation circuit, an amplifier, and the like, an input side of the radio signal transmission circuit 2C is connected to the control circuit 2B, an output side of the radio signal transmission circuit 2C is connected to the transmission antenna 2D. This radio signal transmission circuit 2C generates the first radio signal S1 on the basis of the reference clock Cm. The transmission antenna 2D is configured by various types of antennas capable of radiating the first radio signal S1, transmits the first radio signal S1 toward each of the fixed stations 4 to 6.

Here, a carrier phase Pm included in the first radio signal S1 transmitted by the mobile station 2 is expressed by the following Formula 1 by assuming the angular frequency as $\omega m$, a time as t, and a phase offset as $\varphi m$. In this case, the phase offset refers to a phase shift by the mobile station 2, the reference station 3, and each of the fixed stations 4 to 6 asynchronously and independently operating.

$$Pm = \omega m t + \varphi m \qquad \text{[Formula 1]}$$

Figure 5:
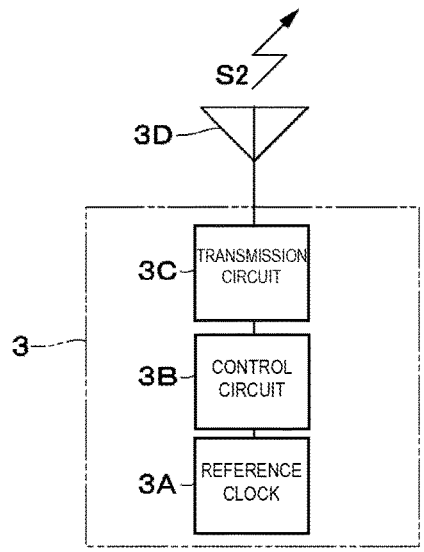
FIG. 5 is a block diagram illustrating the overall configuration of a reference station in FIG. 1.
Figure 6:
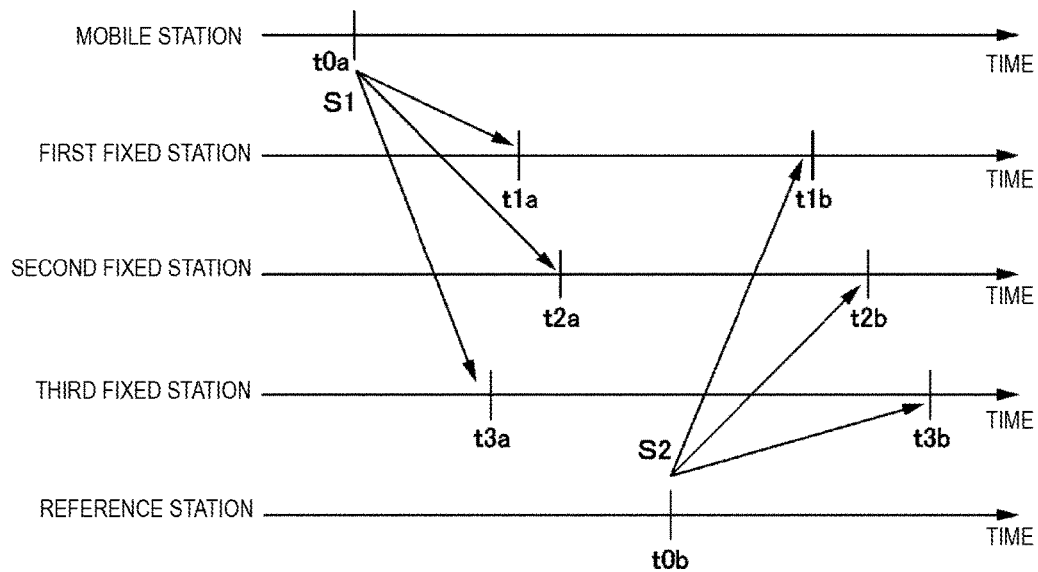
FIG. 6 is a descriptive diagram illustrating a transmission and reception timing of a radio signal by the position detection system according to the first embodiment.

The reference station 3 is disposed at a predetermined position, as illustrated in FIG. 5, is configured by including a reference station reference clock circuit 3A, a control circuit 3B, a radio signal transmission circuit 3C, a transmission antenna 3D, and the like. This reference station 3 transmits the second radio signal S2 toward each of the fixed stations 4 to 6.

The reference station reference clock circuit 3A is, for example, configured by including an oscillator, generates a reference clock Cs with an angular frequency $\omega s$ (carrier frequency) to be a reference of the second radio signal S2 for the transmission antenna 3D. The control circuit 3B is, for example, configured by a microcomputer or the like, controls the timing or the like by which the reference station 3 intermittently transmits the second radio signal S2.

The radio signal transmission circuit 3C includes, for example, a modulation circuit, an amplifier, and the like, an input side of the radio signal transmission circuit 3C is connected to the control circuit 3B, an output side of the radio signal transmission circuit 3C is connected to the transmission antenna 3D. This radio signal transmission circuit 3C generates the second radio signal S2 on the basis of the reference clock Cs. The transmission antenna 3D is configured by various types of antennas capable of radiating the second radio signal S2, and transmits the second radio signal S2 toward each of the fixed stations 4 to 6.

Here, a carrier phase Ps included in the second radio signal S2 transmitted by the reference station 3 is expressed by the following Formula 2 by assuming an angular frequency as ωs, the time as t, and the phase offset as φs.

$$Ps = \omega s t + \phi s \qquad [\text{Formula 2}]$$

Figure 3:
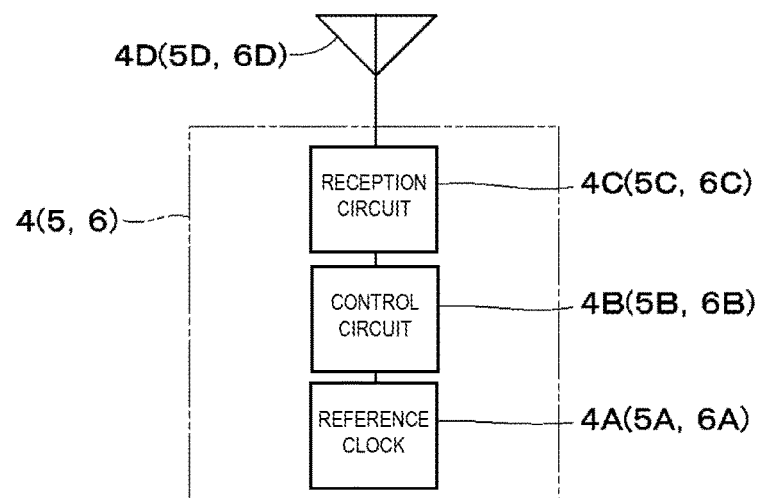
FIG. 3 is a block diagram illustrating the overall configuration of each fixed station in FIG. 1.
Figure 4:
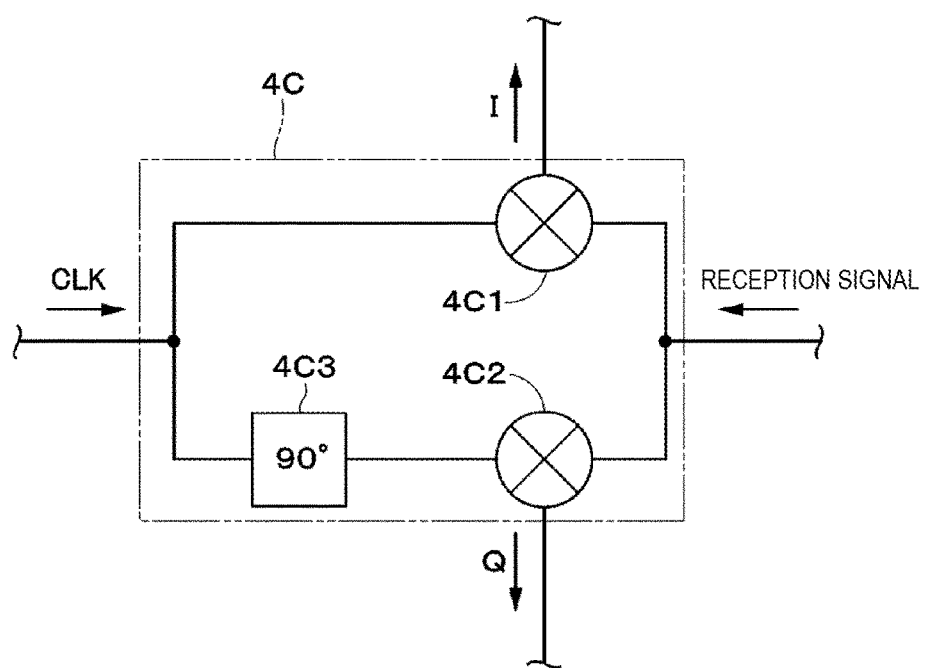
FIG. 4 is a circuit diagram illustrating the configuration of a reception circuit of the fixed station.

The first fixed station 4 is disposed at a predetermined place, as illustrated in FIG. 3, is configured by including a fixed station reference clock circuit 4A, a control circuit 4B, a radio signal reception circuit 4C, a reception antenna 4D, and the like. This first fixed station 4 receives the first radio signal S1 transmitted from the mobile station 2 and the second radio signal S2 transmitted from the reference station 3.

The fixed station reference clock circuit 4A is, for example, configured by including an oscillator, generates a reference clock Cf1 with an angular frequency ωf1 by which the first fixed station 4 operates. The control circuit 4B is, for example, configured by a microcomputer or the like, controls an operation for detecting a phase difference Δφmf1 between the reference clock Cf1 and the first radio signal S1 and a phase difference Δφsf1 between the reference clock Cf1 and the second radio signal S2.

Here, a phase Pf1 of the reference clock Cf1 of the first fixed station 4 is expressed by the following Formula 3, by assuming the angular frequency as ωf1, the time as t, and the phase offset as φf1.

$$Pf1 = \omega f1 t + \phi f1 \qquad [\text{Formula 3}]$$

The radio signal reception circuit 4C is connected to the reception antenna 4D and the control circuit 4B, includes, for example, mixers 4C1 and 4C2, a phase shifter 4C3, a phase detecting circuit (not illustrated), and the like. This radio signal reception circuit 4C extracts the phase difference Δφmf1 between the carrier phase Pm included in the first radio signal S1 received by the reception antenna 4D and the phase Pf1 of the reference clock Cf1 and the phase difference Δφsf1 between the carrier phase Ps included in the second radio signal S2 received by the reception antenna 4D and the phase Pf1 of the reference clock Cf1.

Specifically, the radio signal reception circuit 4C mixes (down-converts) the reference clock Cf1 and the first radio signal S1 (the second radio signal S2) as a reception signal at the mixer 4C1 to generate an I signal. Additionally, the radio signal reception circuit 4C advances (delays) a phase of the reference clock Cf1 outputted from the fixed station reference clock circuit 4A by 90° at the phase shifter 4C3, mixes (down-converts) this reference clock Cf1 whose phase is advanced by 90° and the first radio signal S1 (the second radio signal S2) as a reception signal at the mixer 4C2 to generate a Q signal. These I signal and Q signal are outputted to the phase detecting circuit. The phase detecting circuit calculates the phase difference Δφmf1 between the carrier phase Pm of the first radio signal S1 and the phase Pf1 of the reference clock Cf1 and the phase difference Δφsf1 between the carrier phase Ps of the second radio signal S2 and the phase Pf1 of the reference clock Cf1.

The second fixed station 5 is disposed at a predetermined place, is configured by including, in the same manner as the first fixed station 4, a fixed station reference clock circuit 5A, a control circuit 5B, a radio signal reception circuit 5C, a reception antenna 5D, and the like.

The fixed station reference clock circuit 5A is, for example, configured by including an oscillator, generates a reference clock Cf2 with an angular frequency ωf2 by which the second fixed station 5 operates. The control circuit 5B is, for example, configured by a microcomputer or the like, controls an operation for detecting a phase difference Δφmf2 between the reference clock Cf2 and the first radio signal S1 and a phase difference Δφsf2 between the reference clock Cf2 and the second radio signal S2. Note that, in this case, the second fixed station 5 and the first fixed station 4 operate asynchronously and independently, the angular frequency ωf2 and the angular frequency ωf1 are set to the same angular frequency (ωf2=ωf1) to each other.

Here, a phase Pf2 of the reference clock Cf2 of the second fixed station 5 is expressed by the following Formula 4, by assuming the angular frequency as ωf2, the time as t, and the phase offset as φf2.

$$Pf2 = \omega f2 t + \phi f2 \qquad [\text{Formula 4}]$$

The radio signal reception circuit 5C is connected between the reception antenna 5D and the control circuit 5B, is configured in the same manner as the radio signal reception circuit 4C of the first fixed station 4. This radio signal reception circuit 5C calculates the phase difference Δφmf2 between the carrier phase Pm of the first radio signal S1 received by the reception antenna 5D and the phase Pf2 of the reference clock Cf2 and the phase difference Δφsf2 between the carrier phase Ps of the second radio signal S2 received by the reception antenna 5D and the phase Pf2 of the reference clock Cf2.

The third fixed station 6 is disposed at a predetermined place, is configured by including, in the same manner as the first fixed station 4, a fixed station reference clock circuit 6A, a control circuit 6B, a radio signal reception circuit 6C, a reception antenna 6D, and the like.

The fixed station reference clock circuit 6A is, for example, configured by including an oscillator, generates a reference clock Cf3 with an angular frequency ωf3 by which the third fixed station 6 operates. The control circuit 6B is, for example, configured by a microcomputer or the like, controls an operation for detecting a phase difference Δφmf3 between the reference clock Cf3 and the first radio signal S1 and a phase difference Δφsf3 between the reference clock Cf3 and the second radio signal S2. Note that, in this case, the third fixed station 6 and the first fixed station 4 operate asynchronously and independently, the angular frequency ωf3 and the angular frequency ωf1 are set to the same angular frequency (ωf3=ωf1) to each other.

Here, a phase Pf3 of the reference clock Cf3 of the third fixed station 6 is expressed by the following Formula 5, by assuming the angular frequency as ωf3, the time as t, and the phase offset as φf3.

$$Pf3 = \omega f3 t + \phi f3 \qquad [\text{Formula 5}]$$

The radio signal reception circuit 6C is connected between the reception antenna 6D and the control circuit 6B, is configured in the same manner as the radio signal reception circuit 4C of the first fixed station 4. This radio signal reception circuit 6C calculates the phase difference Δφmf3 between the carrier phase Pm of the first radio signal S1 received by the reception antenna 6D and the phase Pf3 of the reference clock Cf3 and the phase difference Δφsf3 between the carrier phase Ps of the second radio signal S2 received by the reception antenna 6D and the phase Pf3 of the reference clock Cf3.

The server 7 is connected to each of the fixed stations 4 to 6, calculates a position of the mobile station 2, using the phase differences Δφmf1, Δφmf2, and Δφmf3 being phase difference information between the mobile station 2 and each of the fixed stations 4 to 6, and the phase differences Δφsf1, Δφsf2, and Δφsf3 being phase difference information between the reference station 3 and each of the fixed stations 4 to 6. Note that, in this case, the connection between the server 7 and each of the fixed stations 4 to 6 may be a wired connection using a physical cable, or may be a radio connection.

Next, with reference to FIG. 6 to FIG. 9, a position detection method of the position detection system 1 according to the present embodiment will be described.

First, in step 1, as a first radio signal transmission process, the mobile station 2 transmits the first radio signal S1 toward each of the fixed stations 4 to 6. Here, the carrier phase Pm of the first radio signal S1 transmitted by the mobile station 2 at a time t0a is expressed by the following Formula 6.

$$Pm = \omega m t0a + \phi m \quad \text{[Formula 6]}$$

In step 2, as a reference clock phase difference calculation process, the fixed stations 4 to 6 find the phase differences Δφmf1 to Δφmf3, respectively, between the carrier phase Pm of the received first radio signal S1 and the phases Pf1 to Pf3 of the reference clocks Cf1 to Cf3. In other words, assuming that a time when the first fixed station 4 receives the first radio signal S1 is represented by t1a, the phase Pf1 of the reference clock Cf1 is expressed by the following Formula 7, the phase difference Δφmf1 between the carrier phase Pm of the first radio signal S1 and the phase Pf1 of the reference clock Cf1 is expressed by the following Formula 8.

$$Pf1 = \omega f1 t1a + \phi f1 \quad \text{[Formula 7]}$$

$$\Delta \phi mf1 = Pm - Pf1 = \omega m t0a - \omega f1 t1a + \phi m - \phi f1 \quad \text{[Formula 8]}$$

In the same manner, assuming that a time when the second fixed station 5 receives the first radio signal S1 is represented by t2a, the phase Pf2 of the reference clock Cf2 is expressed by the following Formula 9, the phase difference Δφmf2 between the carrier phase Pm of the first radio signal S1 and the phase Pf2 of the reference clock Cf2 is expressed by the following Formula 10.

$$Pf2 = \omega f2 t2a + \phi f2 \quad \text{[Formula 9]}$$

$$\Delta \phi mf2 = Pm - Pf2 = \omega m t0a - \omega f2 t2a + \phi m - \phi f2 \quad \text{[Formula 10]}$$

In the same manner, assuming that a time when the third fixed station 6 receives the first radio signal S1 is represented by t3a, the phase Pf3 of the reference clock Cf3 is expressed by the following Formula 11, the phase difference Δφmf3 between the carrier phase Pm of the first radio signal S1 and the phase Pf3 of the reference clock Cf3 is expressed by the following Formula 12.

$$Pf3 = \omega f3 t3a + \phi f3 \quad \text{[Formula 11]}$$

$$\Delta \phi mf3 = Pm - Pf3 = \omega m t0a - \omega f3 t3a + \phi m - \phi f3 \quad \text{[Formula 12]}$$

Next, in step 3, as a second radio signal transmission process, the reference station 3 transmits the second radio signal S2 toward each of the fixed stations 4 to 6. Here, the carrier phase Ps of the second radio signal S2 transmitted by the reference station 3 at a time t0b is expressed by the following Formula 13.

$$Ps = \omega s t0b + \phi s \quad \text{[Formula 13]}$$

In step 4, as the reference clock phase difference calculation process, the fixed stations 4 to 6 find the phase differences Δφsf1 to Δφsf3, respectively, between the carrier phase Ps of the received second radio signal S2 and the phases Pf1 to Pf3 of the reference clocks Cf1 to Cf3. In other words, assuming that a time when the first fixed station 4 receives the second radio signal S2 is represented by t1b, the phase Pf1 of the reference clock Cf1 is expressed by the following Formula 14, the phase difference Δφsf1 between the carrier phase Ps of the second radio signal S2 and the phase Pf1 of the reference clock Cf1 is expressed by the following Formula 15.

$$Pf1 = \omega f1 t1b + \phi f1 \quad \text{[Formula 14]}$$

$$\Delta \phi sf1 = Ps - Pf1 = \omega s t0b - \omega f1 t1b + \phi s - \phi f1 \quad \text{[Formula 15]}$$

In the same manner, assuming that a time when the second fixed station 5 receives the second radio signal S2 is represented by t2b, the phase Pf2 of the reference clock Cf2 is expressed by the following Formula 16, the phase difference Δφsf2 between the carrier phase Ps of the second radio signal S2 and the phase Pf2 of the reference clock Cf2 is expressed by the following Formula 17.

$$Pf2 = \omega f2 t2b + \phi f2 \quad \text{[Formula 16]}$$

$$\Delta \phi sf2 = Ps - Pf2 = \omega s t0b - \omega f2 t2b + \phi s - \phi f2 \quad \text{[Formula 17]}$$

In the same manner, assuming that a time when the third fixed station 6 receives the second radio signal S2 is represented by t3b, the phase Pf3 of the reference clock Cf3 is expressed by the following Formula 18, the phase difference Δφsf3 between the carrier phase Ps of the second radio signal S2 and the phase Pf3 of the reference clock Cf3 is expressed by the following Formula 19.

$$Pf3 = \omega f3 t3b + \phi f3 \quad \text{[Formula 18]}$$

$$\Delta \phi sf3 = Ps - Pf3 = \omega s t0b - \omega f3 t3b + \phi s - \phi f3 \quad \text{[Formula 19]}$$

Next, in step 5, as a phase offset cancel process, using the phase differences Δφmf1, Δφsf1, Δφmf2, and Δφsf2 obtained in the first and second fixed stations 4 and 5, the server 7 cancels the phase offsets φm, φs, φf1, and φf2 of the reference clocks Cm, Cs, Cf1, and Cf2 of the mobile station 2, the reference station 3, and the first and second fixed stations 4 and 5. In other words, as indicated by the following Formula 20, by subtracting the phase difference information obtained in the second fixed station 5 from the phase difference information obtained in the first fixed station 4, a phase difference Δφ21 in which the phase offsets φm, φs, φf1, and φf2 of the mobile station 2, the reference station 3, and the first and second fixed stations 4 and 5 are canceled is calculated.

$$\Delta \phi 21 = (\Delta \phi sf2 - \Delta \phi mf2) - (\Delta \phi sf1 - \Delta \phi mf1) \quad \text{[Formula 20]}$$
$$= \omega f2(t2a - t2b) - \omega f1(t1a - t1b)$$

In step 6, as a carrier phase difference calculation process, using the phase difference Δφ21 being information that the phase offsets φm, φs, φf1, and φf2 are canceled, the server 7 calculates a carrier phase difference Δ21 between the first fixed station 4 and the second fixed station 5. In other words, by expressing ωf1 and ωf2 in Formula 20 using a frequency deviation Δω indicated by the following Formula 21, the carrier phase difference Δ21 is calculated as indicated in Formula 22.

$$\omega fn = \omega + \Delta \omega fn \quad \text{[Formula 21]}$$

(note that, n=1, 2, 3)

$$\Delta 21 = \omega(t2a - t1a) \qquad \text{[Formula 22]}$$
$$= \Delta\phi 21 + \omega(t2b - t1b) + \Delta\omega f1(t1a - t1b) -$$
$$\Delta\omega f2(t2a - t2b)$$

Here, ω(t2b–t1b) indicated in the second term of the right side of Formula 22 can be found in advance from a relationship between the reference station 3 disposed at the predetermined position and each of the fixed stations 4 and 5. Additionally, when the frequency deviation Δω is sufficiently small, and a gap between a reception time of the first radio signal S1 and a reception time of the second radio signal S2 of each of the fixed stations 4 and 5 is negligible small, the third term and the fourth term of Formula 22 can be considered as 0 (zero). With this, the server 7 calculates the carrier phase difference Δ21.

In subsequent step 7, as a distance difference calculation process, using the carrier phase difference Δ21, the server 7 finds a distance difference Δr12 (=r1–r2) which is a difference between a distance from the first fixed station 4 to the mobile station 2 and a distance from the second fixed station 5 to the mobile station 2. In this case, if the carrier phase difference Δ21 can be found, an arrival time difference of the first radio signal S1 (or the second radio signal S2) can be found in each of the fixed stations 4 and 5, and thus, using a TDOA (Time Differential Of Arrival) method, for example, the distance difference Δr12 which is distance information can be found.

Figure 7:
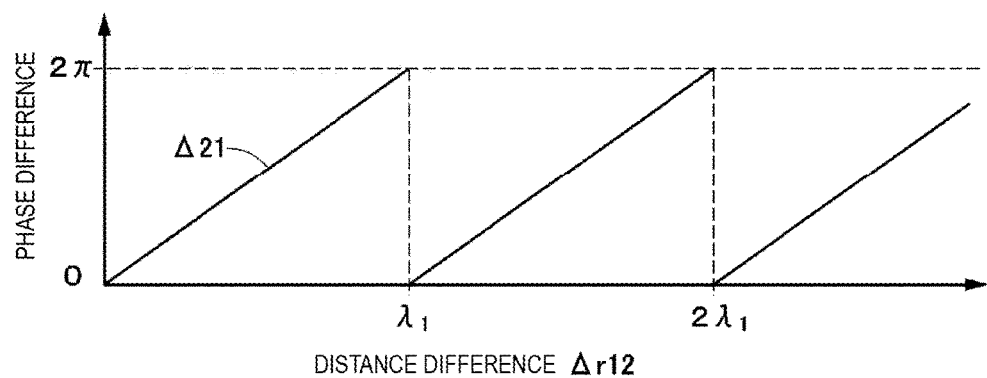
FIG. 7 is a descriptive diagram illustrating a relationship between a carrier phase difference and a distance difference by a first radio signal.

Note that, since the carrier phase difference Δ21 periodically appears every 2π, an absolute value of the carrier phase difference Δ21 cannot be directly found, there is uncertainty of 2nπ (note, however, that, n is an integer), the distance difference πr12 to the carrier phase difference Δ21 is also infinitely present. For example, as illustrated in FIG. 7, assuming that a wave length of the first radio signal S1 is represented by λ₁, the distance difference πr12 which is an integral multiple of the wave length λ₁ is calculated every time the carrier phase difference Δ21 becomes 2π.

Figure 8:
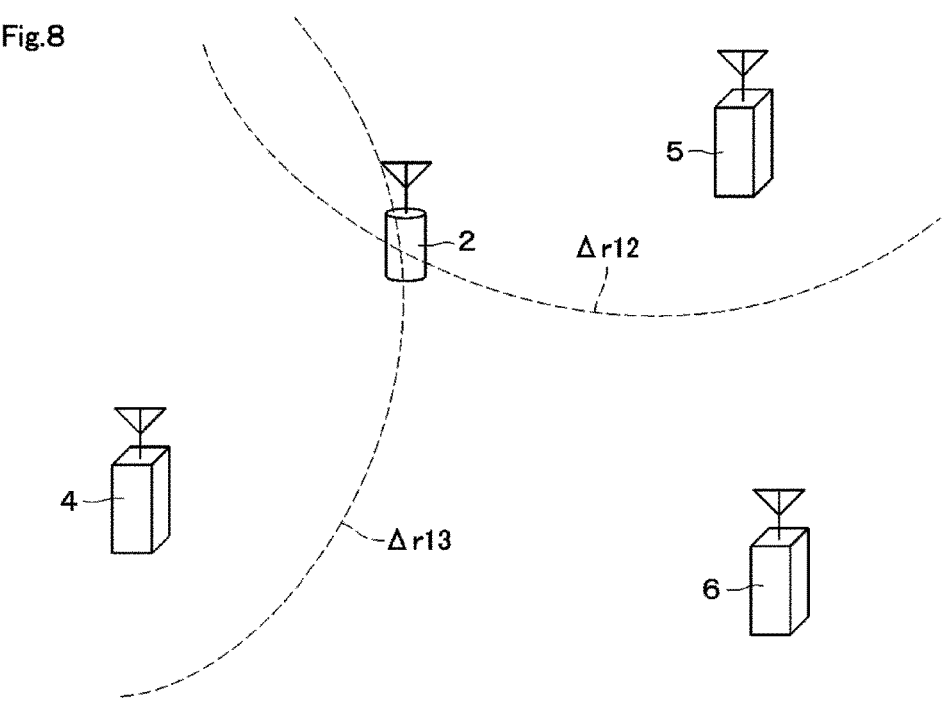
FIG. 8 is a descriptive diagram illustrating a hyperbola by a distance difference between distances from the mobile station to a first fixed station and a second fixed station, and a hyperbola by a distance difference between distances from the mobile station to the first fixed station and a third fixed station.
Figure 9:
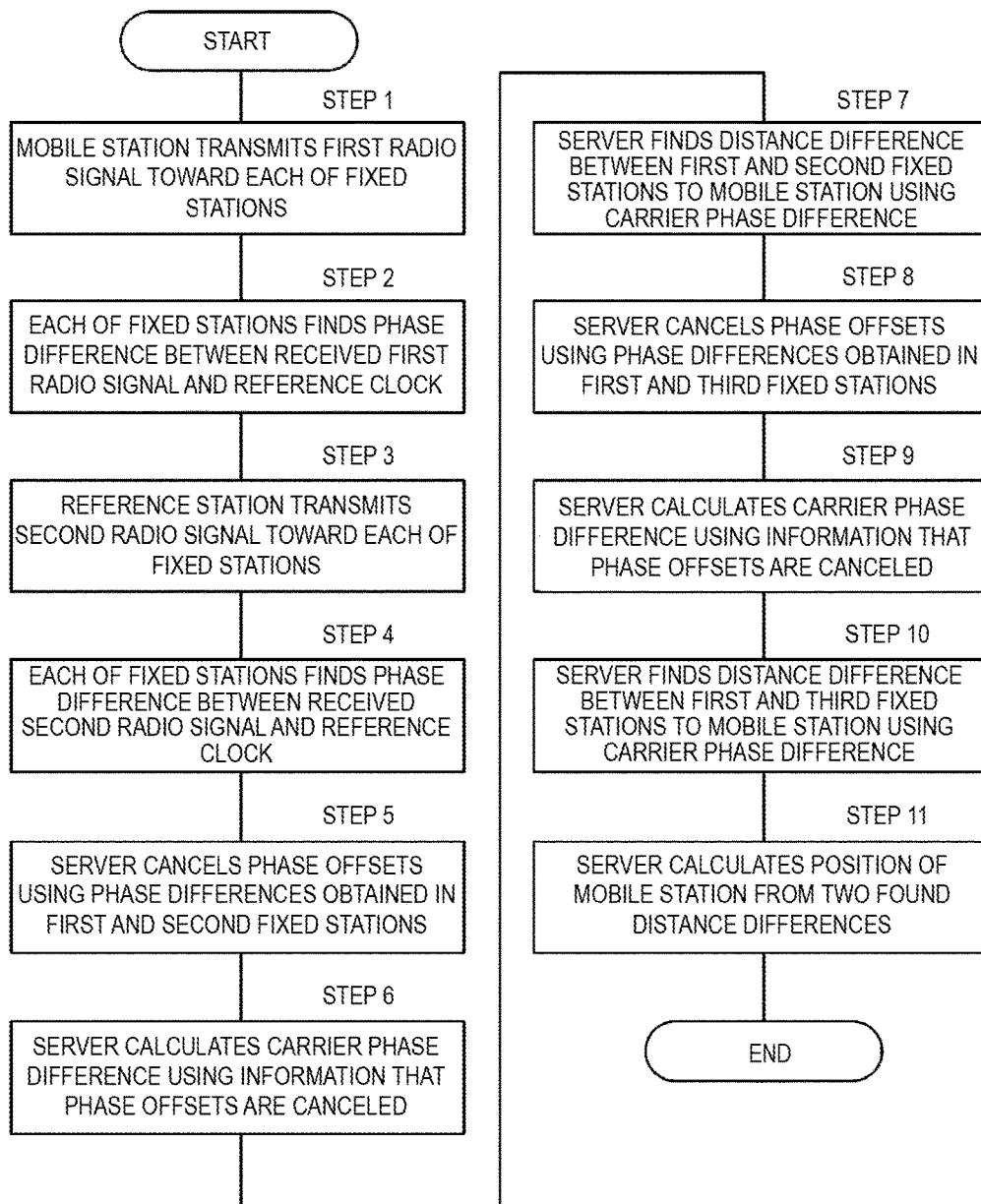
FIG. 9 is a flowchart illustrating an overall processing of the position detection system according to the first embodiment.

In order to eliminate this uncertainty of 2nπ, the position detection system 1 calibrates the carrier phase difference Δ21 in a state where the position of the mobile station 2 is specified to follow the resulting difference as a fluctuation amount from the position. With this, the position detection system 1 uniquely finds the carrier phase difference Δ21, and, as illustrated in FIG. 8, can find a hyperbola of the distance difference πr12 on which the mobile station 2 may be present.

Next, in step 8, as the phase offset cancel process, using the phase differences Δφmf1, Δφsf1, Δφmf3, and Δφsf3 obtained in the first and third fixed stations 4 and 6, the server 7 cancels the phase offsets φm, φs, φf1, and φf3 of the reference clocks Cm, Cs, Cf1, and Cf3 in the mobile station 2, the reference station 3, and the first and third fixed stations 4 and 6. In other words, as indicated by the following Formula 23, by subtracting the phase difference information obtained in the third fixed station 6 from the phase difference information obtained in the first fixed station 4, a phase difference Δφ31 in which the phase offsets φm, φs, φf1, and φf3 of the mobile station 2, the reference station 3, and the first and third fixed stations 4 and 6 are canceled is calculated.

$$\Delta\phi 31 = (\Delta\phi sf3 - \Delta\phi mf3) - (\Delta\phi sf1 - \Delta\phi mf1) \qquad \text{[Formula 23]}$$
$$= \omega f3(t3a - t3b) - \omega f1(t1a - t1b)$$

In step 9, as the carrier phase difference calculation process, using the phase difference Δφ31 being information that the phase offsets φm, φs, φf1, and φf3 are canceled, the server 7 calculates a carrier phase difference Δ31 between the first fixed station 4 and the third fixed station 6. In other words, by expressing ωf1 and ωf3 in Formula 23 using the frequency deviation Δω indicated by Formula 21, the carrier phase difference Δ31 is calculated as indicated in Formula 24.

$$\Delta 31 = \omega(t3a - t1a) \qquad \text{[Formula 24]}$$
$$= \Delta\phi 31 + \omega(t3b - t1b) + \Delta\omega f1(t1a - t1b) -$$
$$\Delta\omega f3(t3a - t3b)$$

Here, ω(t3b–t1b) indicated in the second term of the right side of Formula 24 can be found in advance from a relationship between the reference station 3 disposed at the predetermined position and each of the fixed stations 4 and 6. Additionally, when the frequency deviation Δω is sufficiently small, and a gap between a reception time of the first radio signal S1 and a reception time of the second radio signal S2 of each of the fixed stations 4 and 6 is negligible small, the third term and the fourth term of Formula 24 can be considered as 0 (zero). With this, the server 7 calculates the carrier phase difference Δ31.

In subsequent step 10, as the distance difference calculation process, using the carrier phase difference Δ31, the server 7 finds a distance difference Δr13 (=r1–r3) of the first and third fixed stations 4 and 6 and the mobile station 2. In this case, for example, using the TDOA method, the distance difference Δr13 can be found from the carrier phase difference Δ31.

In step 11, as a mobile station position calculation process, the server 7 calculates the position of the mobile station 2 from the two found distance differences Δr12 and Δr13. In other words, as illustrated in FIG. 8, the server 7 can find the position of the mobile station 2 from a point of intersection of the hyperbola of the distance difference πr12 and a hyperbola of the distance difference Δr13.

As described above, according to the first embodiment, the position detection system 1 is configured to calculate the position of the mobile station 2, using the phase difference information between the mobile station 2 and each of the fixed stations 4 to 6 and the phase difference information between the reference station 3 and each of the fixed stations 4 to 6. In this case, since the carrier phase differences Δ21 and Δ31 of the first radio signal S1 reaching each of the fixed stations 4 to 6 are used, distance resolution shorter than the wave length λ₁ of the first radio signal S1 can be realized. With this configuration, even when detecting the position of the mobile station 2 with enhanced distance resolution, a narrowband radio signal can be used, and it is thus possible to narrow an occupied band width of the radio signal in comparison with a case where a pulse signal is used.

Additionally, using the phase differences Δφmf1, Δφmf2, and Δφmf3 between the mobile station 2 and each of the fixed stations 4 to 6 and the phase differences Δφsf1, Δφsf2, and Δφsf3 between the reference station 3 and each of the fixed stations 4 to 6, the phase offsets φm, φs, and φf1 to φf3 of the mobile station 2, the reference station 3, and each of the fixed stations 4 to 6 are canceled. With this configuration, it is not necessary to synchronize each of the fixed stations 4 to 6, the mobile station 2, and the reference station 3, and thus the system construction can be simplified.

Next, FIG. 1, FIG. 10 to FIG. 12 illustrate a position detection system according to a second embodiment of the present disclosure. A characteristic of the second embodiment is the configuration in which the mobile station transmits a trigger radio signal in order for the reference station to transmit the second radio signal. Note that, in the second embodiment, the same configuration as that in the first embodiment described above will be given the same reference numerals, and descriptions thereof will be omitted.

A position detection system 11 according to the second embodiment has almost the same configuration as that of the position detection system 11 according to the first embodiment. Accordingly, the position detection system 1 is configured by including the mobile station 2, a reference station 12, the first fixed station 4, the second fixed station 5, the third fixed station 6, the server 7, and the like. Note, however, that, the reference station 12 includes a radio signal reception circuit 12D and a transmission/reception antenna 12F in order to receive a trigger radio signal St from the mobile station 2. This point is different from the first embodiment.

Figure 10:
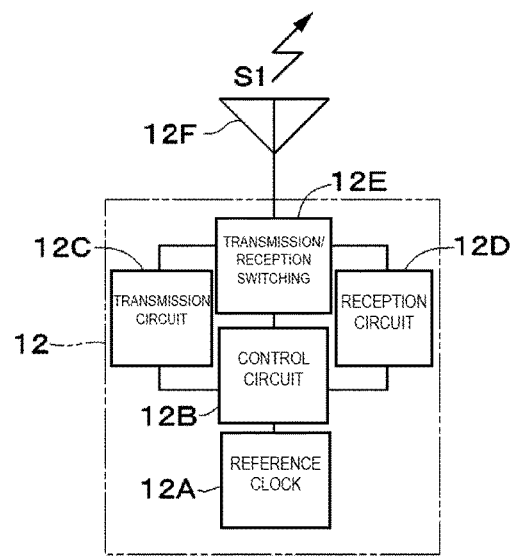
FIG. 10 is a block diagram illustrating the overall configuration of a reference station according to the second and third embodiments.

The reference station 12 is disposed at a predetermined position, as illustrated in FIG. 10, is configured by including a reference station reference clock circuit 12A, a control circuit 12B, a radio signal transmission circuit 12C, the radio signal reception circuit 12D, a transmission/reception switching circuit 12E, the transmission/reception antenna 12F, and the like. This reference station 12 transmits the second radio signal S2 toward each of the fixed stations 4 to 6 upon receiving the trigger radio signal St transmitted by the mobile station 2.

The reference station reference clock circuit 12A is, for example, configured by including an oscillator, generates the reference clock Cs with the angular frequency ωs (carrier frequency) to be a reference of the second radio signal S2 for the transmission/reception antenna 12F. The control circuit 12B is, for example, configured by a microcomputer or the like, controls an operation or the like in which the reference station 12 receives the trigger radio signal St and intermittently transmits the second radio signal S2.

The radio signal transmission circuit 12C is connected to the control circuit 12B and the transmission/reception switching circuit 12E, includes, for example, a modulation circuit, an amplifier, and the like. This radio signal transmission circuit 12C generates the second radio signal S2 on the basis of the reference clock Cs. On the other hand, the radio signal reception circuit 12D is connected to the control circuit 12B and the transmission/reception switching circuit 12E, includes, for example, an amplifier, a filter, and the like. This radio signal reception circuit 12D amplifies the trigger radio signal St received by the transmission/reception antenna 12F, and removes a noise from the trigger radio signal St to output the resulting signal to the control circuit 12B.

The transmission/reception switching circuit 12E connects the radio signal transmission circuit 12C and the radio signal reception circuit 12D and the transmission/reception antenna 12F. This transmission/reception switching circuit 12E switches transmission and reception by an instruction from the control circuit 12B, outputs the second radio signal S2 from the radio signal transmission circuit 12C to the transmission/reception antenna 12F, and outputs the trigger radio signal St received by the transmission/reception antenna 12F to the radio signal reception circuit 12D. The transmission/reception antenna 12F is configured by various types of antennas capable of receiving the trigger radio signal St and radiating the second radio signal S2, transmits the second radio signal S2 toward each of the fixed stations 4 to 6.

Next, with reference to FIG. 11 and FIG. 12, a position detection method of the position detection system 11 according to the second embodiment will be described. Note that, in this case, step 21 is executed instead of step 1 of the first embodiment illustrated in FIG. 9, step 22 is executed instead of step 3. Other configurations are the same as those in the first embodiment illustrated in FIG. 9, and descriptions thereof will be omitted.

Figure 11:
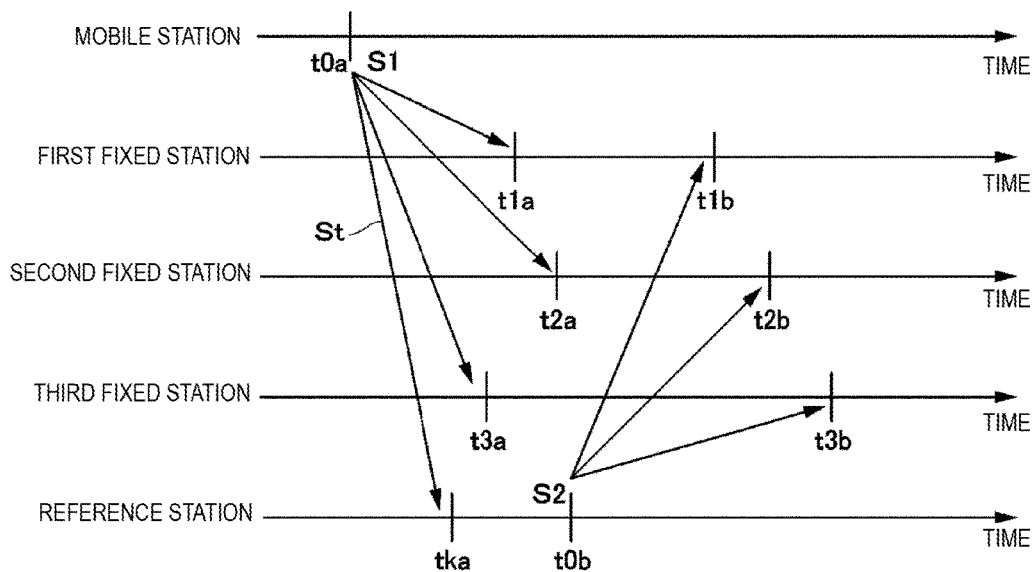
FIG. 11 is a descriptive diagram illustrating a transmission and reception timing of a radio signal by the position detection system according to the second and third embodiments.
Figure 12:
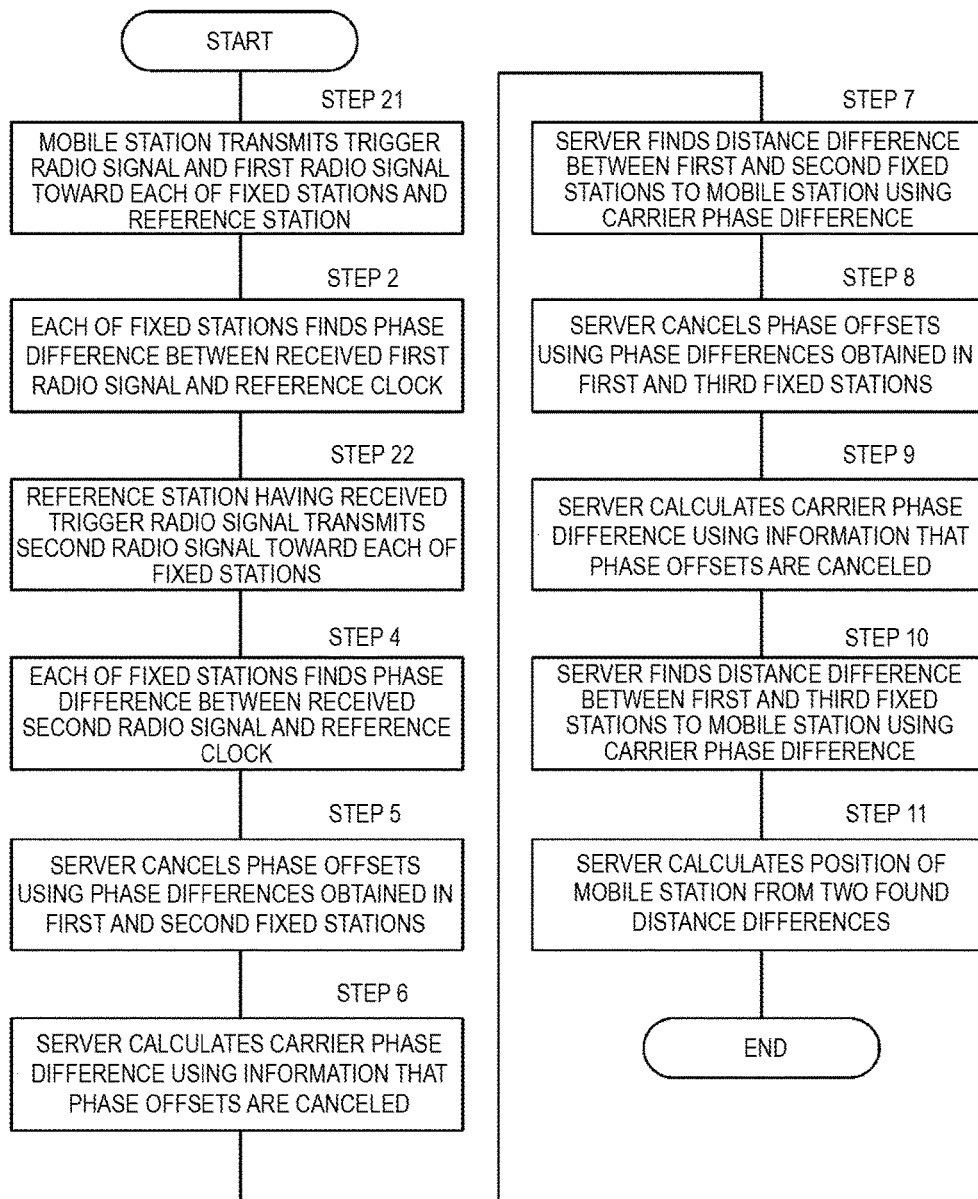
FIG. 12 is a flowchart illustrating an overall processing of the position detection system according to the second and third embodiments.

In step 21, as a radio signal transmission process, the mobile station 2 transmits the first radio signal S1 toward each of the fixed stations 4 to 6, further transmits the trigger radio signal St in order for the reference station 12 to transmit the second radio signal S2 (see FIG. 11). Note that, as this trigger radio signal St, the same radio signal as the first radio signal S1 may be transmitted. Additionally, the trigger radio signal St may be transmitted as a different radio signal from the first radio signal S1 by various types of signal modulation, for example.

In step 22, as the second radio signal transmission process, the reference station 12 which has received the trigger radio signal St transmits the second radio signal S2 toward each of the fixed stations 4 to 6. In this case, the reference station 12 which has received the trigger radio signal St at a time tka may transmit the second radio signal S2 after a predetermined period of time has passed.

As described above, almost the same actions and effects as those in the first embodiment can be obtained in the second embodiment as well. In the second embodiment, the configuration is such that the mobile station 2 transmits the trigger radio signal St, and the reference station 12 transmits the second radio signal S2 upon receiving the trigger radio signal St transmitted by the mobile station 2. This makes it possible, in comparison with a case where the reference station 12 transmits the second radio signal S2 independently from the mobile station 2, to shorten gaps (t1$b$–t1$a$, t2$b$–t2$a$, and t3$b$–t3$a$) between times t1$a$, t2$a$, and t3$a$ when each of the fixed stations 4 to 6 receives the first radio signal S1 from the mobile station 2 and times t1$b$, t2$b$, and t3$b$ when each of the fixed stations 4 to 6 receives the second radio signal S2 from the reference station 12, respectively. As a result, phase rotation by frequency deviation of each of the fixed stations 4 to 6 can be suppressed to be small, and it is thus possible to enhance accuracy of a phase correction, and realize highly accurate position detection.

Next, a position detection system according to a third embodiment of the present disclosure will be described. A characteristic of the third embodiment is the configuration in which the mobile station reference clock circuit and the reference station reference clock circuit generate a reference clock with the same frequency (angular frequency) as that in each of the fixed station reference clock circuits. Note that, in the third embodiment, the same configuration as those in the first and second embodiments described above will be given the same reference numerals, and descriptions thereof will be omitted. Additionally, a position detection method of the position detection system according to the third embodiment is the same as the position detection method of the position detection system according to the second embodiment described above, and descriptions thereof will be omitted.

A position detection system 21 according to the third embodiment has almost the same configuration as that of the position detection system 11 according to the second embodiment. Accordingly, the position detection system 21 is configured by including the mobile station 2, the reference station 12, the first fixed station 4, the second fixed station 5, the third fixed station 6, the server 7, and the like.

Here, the mobile station reference clock circuit 2A of the mobile station 2 generates the reference clock Cm with the angular frequency ωm which is the same as those of the fixed station reference clock circuits 4A to 6A of the respective fixed stations 4 to 6. In other words, the angular frequency ωm as a carrier frequency of the first radio signal S1 and the angular frequencies ωf1 to ωf3 of the respective fixed station reference clock circuits 4A to 6A satisfy a relationship expressed by the following Formula 25.

$$\omega m = \omega f1 = \omega f2 = \omega f3 \quad [\text{Formula 25}]$$

Additionally, the reference station reference clock circuit 12A of the reference station 12 generates the reference clock Cs with the angular frequency ωs which is the same as those of the fixed station reference clock circuits 4A to 6A of the respective fixed stations 4 to 6. In other words, the angular frequency ωs as a carrier frequency of the second radio signal S2 and the angular frequencies ωf1 to ωf3 of the respective fixed station reference clock circuits 4A to 6A satisfy a relationship expressed by the following Formula 26.

$$\omega s = \omega f1 = \omega f2 = \omega f3 \quad [\text{Formula 26}]$$

As described above, almost the same actions and effects as those in the first and second embodiments can be obtained in the third embodiment as well. In the third embodiment, the configuration is such that the mobile station reference clock circuit 2A and the reference station reference clock circuit 12A generate the reference clocks Cm and Cs with the angular frequencies ωm and ωs, respectively, which are the same as those of the respective fixed station reference clock circuits 4A to 6A. In this case, since the angular frequencies ωm and ωs as carrier frequencies of the first and second radio signals S1 and S2 and the angular frequencies ωf1 to ωf3 of the respective reference clocks Cf1 to Cf3 of the fixed stations 4 to 6 are the same, even when a phase detection timing shifts, the phase differences Δφmf1 to φmf3 and Δφsf1 to φsf3 between the carrier phases Pm and Ps of the first and second radio signals S1 and S2 and the reference clock phases Pf1 to Pf3 of the respective fixed stations 4 to 6 do not almost change. Accordingly, measurement variation decreases, and it is thus possible to realize highly accurate position detection.

In other words, when the angular frequencies ωm and ωs of the first and second radio signals S1 and S2 and the angular frequencies ωf1 to ωf3 of the respective fixed stations 4 to 6 are the same, by calculating a difference between the carrier phases Pm and Ps and the reference clock phases Pf1 to Pf3 of the respective fixed stations 4 to 6, a shift of a phase detection timing can be canceled out. As a result, a configuration can be made in which the phase differences Δφmf1 to φmf3 and Δφsf1 to φsf3 between the carrier phases Pm and Ps of the first and second radio signals S1 and S2 and the reference clock phases Pf1 to Pf3 of the respective fixed stations 4 to 6 do not depend on a measurement time, and it is thus possible to suppress variation in the measurement, and calculate the position of the mobile station 2 with high accuracy.

Figure 13:
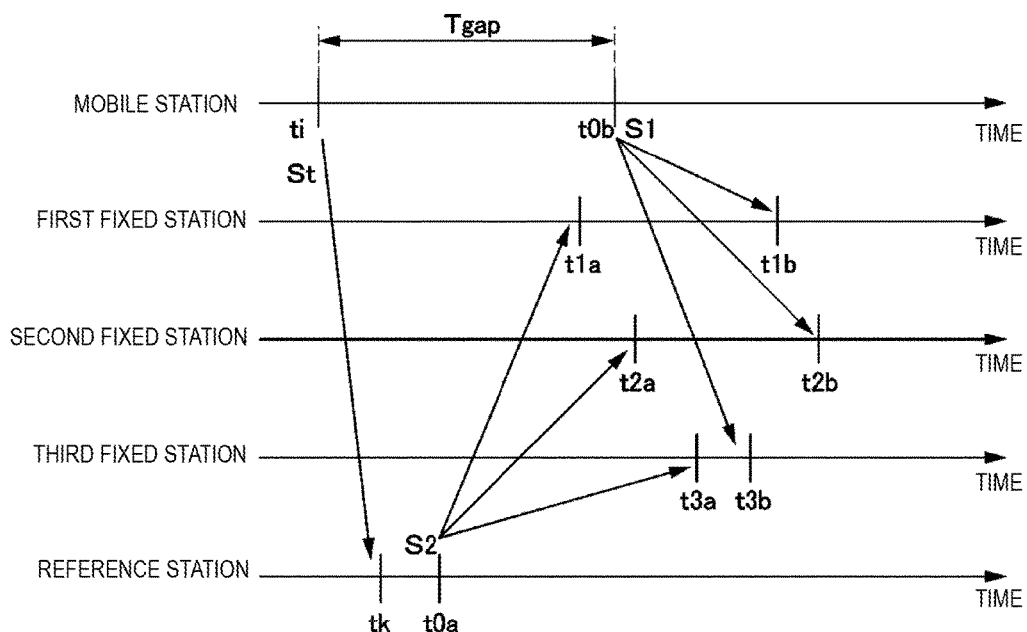
FIG. 13 is a descriptive diagram illustrating a transmission and reception timing of a radio signal by the position detection system according to the fourth embodiment.
Figure 14:
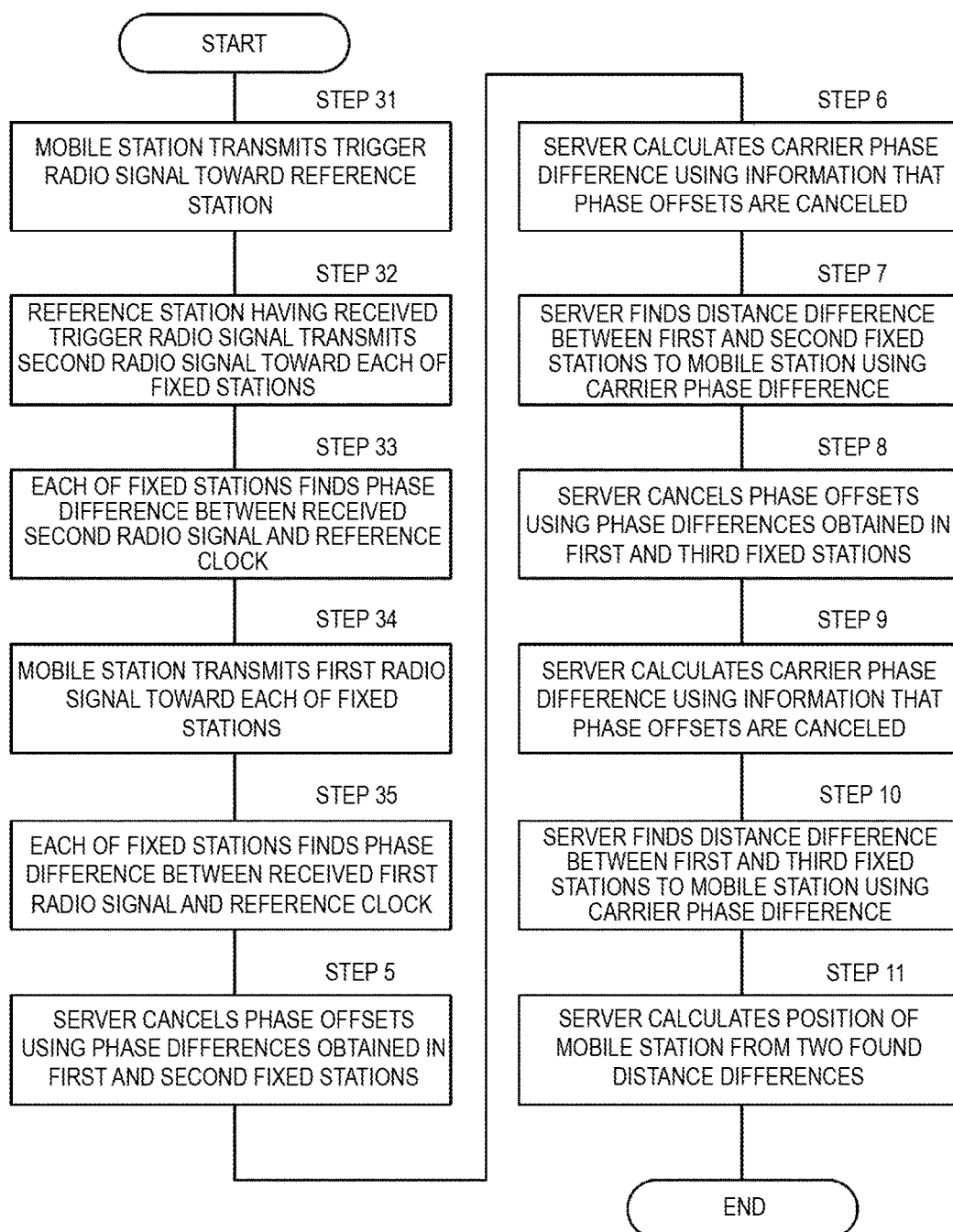
FIG. 14 is a flowchart illustrating an overall processing of the position detection system according to the fourth embodiment.

Next, FIG. 1, FIG. 13, and FIG. 14 illustrate a position detection system according to a fourth embodiment of the present disclosure. A characteristic of the fourth embodiment is the configuration in which the mobile station transmits the trigger radio signal and the first radio signal with a predetermined time gap. Note that, in the fourth embodiment, the same configuration as those in the first and second embodiments described above will be given the same reference numerals, and descriptions thereof will be omitted.

A position detection system 31 according to the fourth embodiment has almost the same configuration as that of the position detection system 11 according to the second embodiment. Accordingly, the position detection system 31 is configured by including the mobile station 2, the reference station 12, the first fixed station 4, the second fixed station 5, the third fixed station 6, the server 7, and the like.

Next, with reference to FIG. 13 and FIG. 14, a position detection method of the position detection system 31 according to the fourth embodiment will be described. Note that, in this case, step 31 to step 35 are executed instead of step 1 to step 4 of the first embodiment illustrated in FIG. 9. Other configurations are the same as those of the first embodiment illustrated in FIG. 9, and descriptions thereof will be omitted.

In step 31, as a trigger radio signal transmission process, the mobile station 2 transmits the trigger radio signal St toward the reference station 12. In this case, as illustrated in FIG. 13, the mobile station 2 transmits the trigger radio signal St at a time ti.

In step 32, as the second radio signal transmission process, the reference station 12 which has received the trigger radio signal St transmits the second radio signal S2 toward each of the fixed stations 4 to 6. In this case, the reference station 12 which has received the trigger radio signal St at a time tk may transmit the second radio signal S2 at a time t0a after a predetermined period of time has passed.

In step 33, as the reference clock phase difference calculation process, the fixed stations 4 to 6 find the phase differences Δφsf1 to φsf3, respectively, between the carrier phase Ps of the received second radio signal S2 and the phases Pf1 to Pf3 of the reference clocks Cf1 to Cf3. In other words, in the same manner as the first embodiment described above, using the times t1a to t3a when the fixed stations 4 to 6 respectively receive the second radio signal S2, the phases Pf1 to Pf3 of the reference clocks Cf1 to Cf3 are respectively found, the phase differences Δφsf1 to Δφsf3 between the carrier phase Ps of the second radio signal S2 and the phases Pf1 to Pf3 of the reference clocks Cf1 to Cf3 are respectively found.

In step 34, as the first radio signal transmission process, the mobile station 2 transmits the first radio signal S1 toward each of the fixed stations 4 to 6. In this case, the mobile station 2 transmits the trigger radio signal St and the first radio signal S1 with a predetermined time gap Tgap. In other words, the transmission time ti of the trigger radio signal St is different from the transmission time t0b of the first radio signal S1 by the time gap Tgap (Tgap=t0b−ti).

In step 35, as the reference clock phase difference calculation process, the fixed stations 4 to 6 find the phase difference Δφmf1 to φmf3, respectively, between the carrier phase Pm of the received first radio signal S1 and the phases Pf1 to Pf3 of the reference clocks Cf1 to Cf3. In other words, in the same manner as the first embodiment described above, using the times t1b to t3b when the fixed stations 4 to 6 respectively receive the first radio signal S1, the phases Pf1 to Pf3 of the reference clocks Cf1 to Cf3 are respectively found, the phase differences Δφmf1 to Δφmf3 between the carrier phase Pm of the first radio signal S1 and the phases Pf1 to Pf3 of the reference clocks Cf1 to Cf3 are respectively found.

As described above, almost the same actions and effects as those in the first and second embodiments can be obtained in the fourth embodiment as well. In the fourth embodiment, the configuration is such that the mobile station 2 transmits the trigger radio signal St and the first radio signal S1 with the predetermined time gap Tgap. In this case, the mobile station 2 can transmit the first radio signal S1 without receiving the second radio signal S2 from the reference station 12 which has received the trigger radio signal St. This makes it possible to shorten a gap between the times t1$b$ to t3$b$ when the fixed stations 4 to 6 respectively receive the first radio signal S1 from the mobile station 2 and the times t1$a$ to t3$a$ when the fixed stations 4 to 6 respectively receive the second radio signal S2 from the reference station 12. As a result, phase rotation by frequency deviation of each of the fixed stations 4 to 6 can be suppressed to be small, and it is thus possible to enhance accuracy of a phase correction and realize highly accurate position detection.

Figure 15:
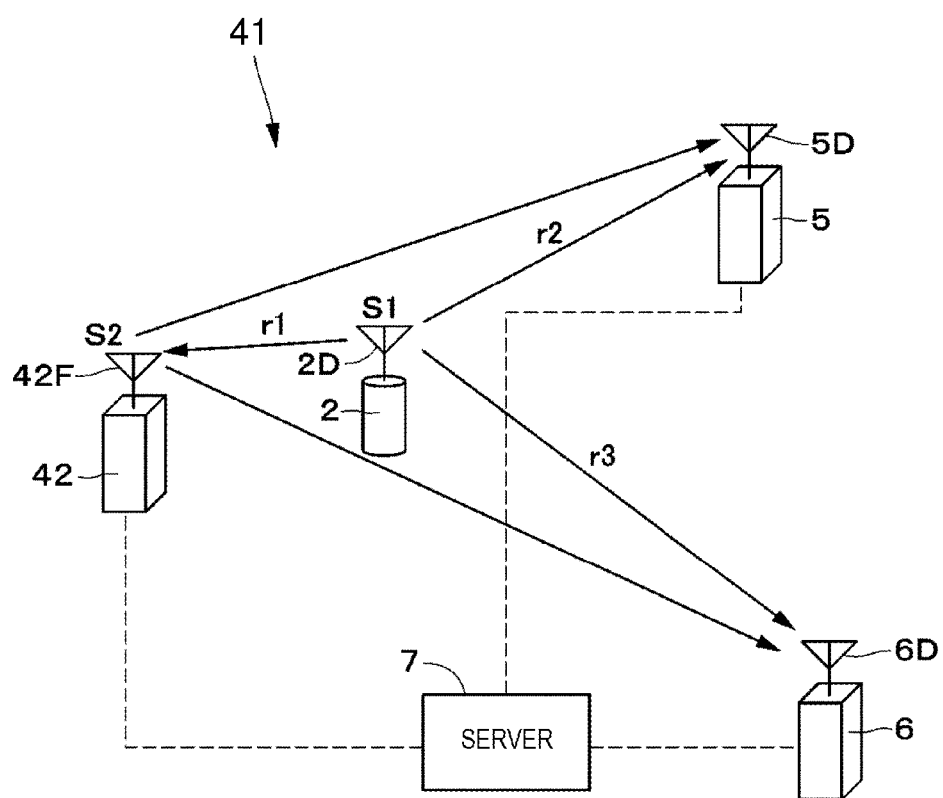
FIG. 15 is a block diagram illustrating the overall configuration of a position detection system according to a fifth embodiment.
Figure 16:
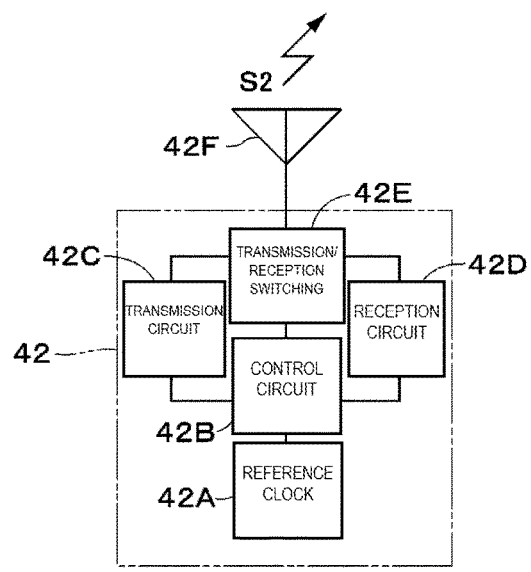
FIG. 16 is a block diagram illustrating the overall configuration of a first fixed station according to the fifth embodiment.
Figure 17:
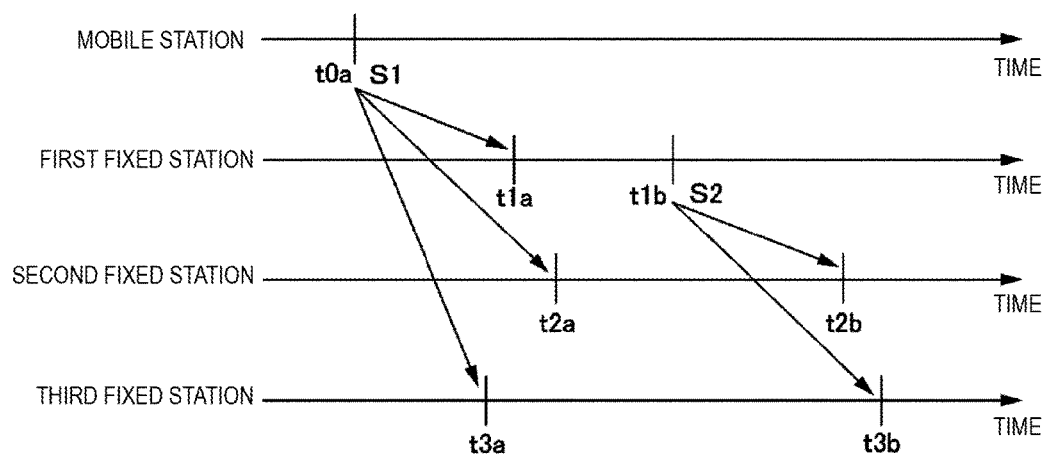
FIG. 17 is a descriptive diagram illustrating a transmission and reception timing of a radio signal by the position detection system according to the fifth embodiment.

Next, FIG. 15 to FIG. 17 illustrate a position detection system according to a fifth embodiment of the present disclosure. A characteristic of the fifth embodiment is the configuration in which the first fixed station also includes the function of the reference station. Note that, in the fifth embodiment, the same configuration as that in the first embodiment described above will be given the same reference numerals, and descriptions thereof will be omitted.

A position detection system 41 according to the fifth embodiment has almost the same configuration as that of the position detection system 1 according to the first embodiment. Accordingly, the position detection system 41 is configured by including the mobile station 2, a first fixed station 42, the second fixed station 5, the third fixed station 6, the server 7, and the like. Note that, however, the first fixed station 42 includes a radio signal transmission circuit 42C and a transmission/reception antenna 42F in order to also include the function of the reference station. This point is different from the first embodiment.

The first fixed station 42 is disposed at a predetermined position, as illustrated in FIG. 16, is configured by including a fixed station reference clock circuit 42A, a control circuit 42B, the radio signal transmission circuit 42C, a radio signal reception circuit 42D, a transmission/reception switching circuit 42E, the transmission/reception antenna 42F, and the like. This first fixed station 42 also includes the function of the reference station, transmits the second radio signal S2 toward each of the fixed stations 5 and 6.

The fixed station reference clock circuit 42A is, for example, configured by including an oscillator, generates the reference clock Cf1 with the angular frequency ωf1 (carrier frequency) to be a reference of the second radio signal S2 for the transmission/reception antenna 42F. The control circuit 42B is, for example, configured by a microcomputer or the like, controls the operation or the like that the first fixed station 42 intermittently transmits the second radio signal S2.

The radio signal transmission circuit 42C is connected to the control circuit 42B and the transmission/reception switching circuit 42E, includes a modulation circuit, an amplifier, and the like, for example. This radio signal transmission circuit 42C generates the second radio signal S2 on the basis of the reference clock Cf1. On the other hand, the radio signal reception circuit 42D is connected to the control circuit 42B and the transmission/reception switching circuit 42E, includes a mixer, a phase shifter (not illustrated either) and the like, for example. This radio signal reception circuit 42D calculates the phase difference Δφmf1 between the carrier phase Pm of the first radio signal S1 which is received by the transmission/reception antenna 42F and the phase Pf1 of the reference clock Cf1.

The transmission/reception switching circuit 42E connects the radio signal transmission circuit 42C and the radio signal reception circuit 42D and the transmission/reception antenna 42F. This transmission/reception switching circuit 42E switches transmission and reception by an instruction from the control circuit 42B, outputs the second radio signal S2 from the radio signal transmission circuit 42C to the transmission/reception antenna 42F, and outputs the first radio signal S1 which is received by the transmission/reception antenna 42F to the radio signal reception circuit 42D. The transmission/reception antenna 42F is configured by various types of antennas capable of radiating the second radio signal S2, and transmits the second radio signal S2 toward each of the fixed stations 5 and 6.

Next, a position detection method of the position detection system 41 according to the fifth embodiment will be described. The position detection system 41 according to the fifth embodiment calculates the position of the mobile station 2 using the position detection method illustrated in FIG. 9 in the same manner as the position detection system 1 according to the above-described first embodiment.

Note that, in this case, as the phase offset cancel process between the first fixed station 42 and the second fixed station 5, the server 7 finds a difference between one piece of phase difference information obtained in the first fixed station 42 (the phase difference information by the first radio signal S1) and two pieces of phase difference information obtained in the second fixed station 5 (the phase difference information by the first radio signal S1 and the phase difference information by the second radio signal S2) to cancel the phase offsets φm, φf1, and φf2 of the mobile station 2 and the first and second fixed stations 42 and 5. In other words, the first fixed station 42 also includes the function of the reference station, and therefore cancels the phase offsets φm, φf1, and φf2 of the mobile station 2 and the first and second fixed stations 42 and 5 by using the three pieces of phase difference information.

In the same manner, as the phase offset cancel process between the first fixed station 42 and the third fixed station 6, the server 7 finds a difference between the one piece of phase difference information obtained in the first fixed station 42 (the phase difference information by the first radio signal S1) and two pieces of phase difference information obtained in the third fixed station 6 (the phase difference information by the first radio signal S1 and the phase difference information by the second radio signal S2) to cancel the phase offsets φm, φf1, and φf3 of the mobile station 2 and the first and third fixed stations 42 and 6.

As described above, almost the same actions and effects as those in the first embodiment can be obtained in the fifth embodiment as well. In fifth embodiment, the configuration is such that the first fixed station 42 also includes the function of the reference station and transmits the second radio signal S2. In this case, using the second radio signal S2 transmitted from the first fixed station 42, the phase offsets φm, and φf1 to φf3 of the mobile station 2 and each of the fixed stations 4 to 6 can be canceled, it is therefore not necessary for the reference station to be separately provided. As a result, the system can be simply constructed, and thus the cost can be suppressed.

Next, FIG. 1 and FIG. 18 to FIG. 20 illustrate a position detection system according to a sixth embodiment of the present disclosure. A characteristic of the sixth embodiment is the configuration in which the mobile station transmits first radio signals with two or more types of carrier frequencies. Note that, in the sixth embodiment, the same configuration as those in the first and second embodiments described above will be given the same reference numerals, and descriptions thereof will be omitted.

A position detection system 51 according to the sixth embodiment has almost the same configuration as that of the position detection system 11 according to the second embodiment. Accordingly, the position detection system 51 is configured by including the mobile station 2, the reference station 12, the first fixed station 4, the second fixed station 5, the third fixed station 6, the server 7, and the like.

Here, the mobile station 2 transmits first radio signals S1 and S1' with two types of carrier frequencies (angular frequencies) toward each of the fixed stations 4 to 6. In this case, the mobile station reference clock circuit 2A of the mobile station 2 generates reference clocks Cm and Cm' with two frequencies. In other words, the mobile station reference clock circuit 2A generates the reference clock Cm with an angular frequency ωm to be a reference of the first radio signal S1 and the reference clock Cm' with an angular frequency ωm' to be a reference of the first radio signal S1'.

Next, with reference to FIG. 18 to FIG. 20, a position detection method of the position detection system 51 according to the sixth embodiment will be described.

Figure 18:
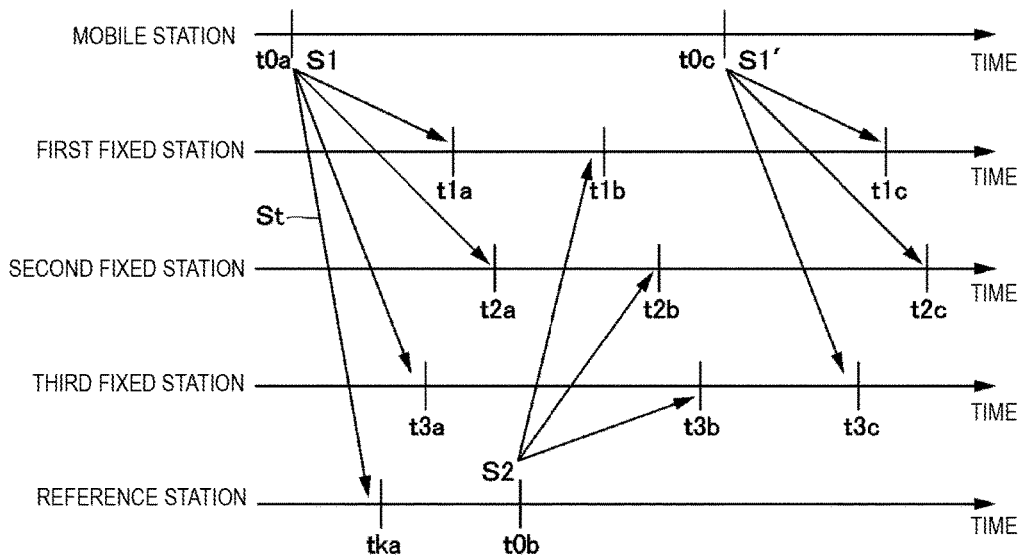
FIG. 18 is a descriptive diagram illustrating a transmission and reception timing of a radio signal by the position detection system according to the sixth embodiment.

First, in step 41, as the first radio signal transmission process, the mobile station 2 transmits the first radio signal S1 toward each of the fixed stations 4 to 6, and further transmits the trigger radio signal St in order for the reference station 12 to transmit the second radio signal S2 (see FIG. 18).

In step 42, as the reference clock phase difference calculation process, the fixed stations 4 to 6 find the phase differences Δφmf1 to φmf3, respectively, between the carrier phase Pm of the received first radio signal S1 and the phases Pf1 to Pf3 of the reference clocks Cf1 to Cf3 (see Formula 6 to Formula 12).

Next, in step 43, as the second radio signal transmission process, the reference station 12 which has received the trigger radio signal St transmits the second radio signal S2 toward each of the fixed stations 4 to 6. In this case, the reference station 12 which has received the trigger radio signal St at a time tka may transmit the second radio signal S2 after a predetermined period of time has passed.

In step 44, as the reference clock phase difference calculation process, the fixed stations 4 to 6 find the phase differences Δφsf1 to φsf3, respectively, between the carrier phase Ps of the received second radio signal S2 and the phases Pf1 to Pf3 of the reference clocks Cf1 to Cf3 (see Formula 13 to Formula 19).

Next, in step 45, the mobile station 2 transmits the first radio signal S1' with a different carrier frequency from the first radio signal S1 toward each of the fixed stations 4 to 6. In other words, the mobile station reference clock circuit 2A generates the reference clock Cm' with the angular frequency ωm' to be a reference of the first radio signal S1', transmits the first radio signal S1' through the transmission antenna 2D. Here, a carrier phase Pm' of the first radio signal S1' transmitted by the mobile station 2 at a time t0c is expressed by the following Formula 27.

$$Pm' = \omega m' t0c + \phi m \qquad \text{[Formula 27]}$$

In step 46, as the reference clock phase difference calculation process, the fixed stations 4 to 6 find phase differences Δφmf1' to Δφmf3', respectively, between the carrier phase Pm' of the received first radio signal S1' and the phases Pf1 to Pf3 of the reference clocks Cf1 to Cf3. In other words, assuming that a time when the first fixed station 4 receives the first radio signal S1' is represented by t1c, the phase Pf1 of the reference clock Cf1 is expressed by the following Formula 28, the phase difference Δφmf1' between the carrier phase Pm' of the first radio signal S1' and the phase Pf1 of the reference clock Cf1 is expressed by the following Formula 29.

$$Pf1 = \omega f1 t1c + \phi f1 \qquad \text{[Formula 28]}$$

$$\Delta \phi mf1' = Pm' - Pf1 = \omega m' t0c = \omega f1 t1c + \phi m - \phi f1 \qquad \text{[Formula 29]}$$

In the same manner, assuming that a time when the second fixed station 5 receives the first radio signal S1' is represented by t2c, the phase Pf2 of the reference clock Cf2 is expressed by the following Formula 30, the phase difference Δφmf2' between the carrier phase Pm' of the first radio signal S1' and the phase Pf2 of the reference clock Cf2 is expressed by the following Formula 31.

$$Pf2 = \omega f2 t2c + \phi f2 \qquad \text{[Formula 30]}$$

$$\Delta \phi mf2' = Pm' - Pf2 = \omega m' t0c - \omega f2 t2c + \phi m - \phi f2 \qquad \text{[Formula 31]}$$

In the same manner, assuming that a time when the third fixed station 6 receives the first radio signal S1' is represented by t3c, the phase Pf3 of the reference clock Cf3 is expressed by the following Formula 32, the phase difference Δφmf3' between the carrier phase Pm' of the first radio signal S1' and the phase Pf3 of the reference clock Cf3 is expressed by the following Formula 33.

$$Pf3 = \omega f3 t3c + \phi f3 \qquad \text{[Formula 32]}$$

$$\Delta \phi mf3' = Pm' - Pf3 = \omega m' t0c - \omega f3 t3c + \phi m - \phi f3 \qquad \text{[Formula 33]}$$

Next, in step 47, as the phase offset cancel process, using the phase differences Δφmf1, Δφsf1, Δφmf1', Δφmf2, Δφsf2, and Δφmf2' obtained in the first and second fixed stations 4 and 5, the server 7 cancels the phase offsets φm, φs, φf1, and φf2 of the reference clocks Cm, Cs, Cf1, and Cf2 in the mobile station 2, the reference station 12, and the first and second fixed stations 4 and 5. In other words, the phase difference Δφ21 is calculated using the above-described Formula 20, a phase difference Δφ21' is calculated using the following Formula 34.

$$\Delta\phi 21' = (\Delta\phi mf2' - \Delta\phi sf2) - (\Delta\phi mf1' - \Delta\pi\phi sf1) \qquad \text{[Formula 34]}$$
$$= \omega f1(t1c - t1b) - \omega f2(t2c - t2b)$$

In step 48, as the carrier phase difference calculation process, using the phase differences Δφ21 and Δφ21' being information that the phase offsets φm, φs, φf1, and φf2 are canceled, and the server 7 calculates the carrier phase differences Δ21 and Δ21' between the first fixed station 4 and the second fixed station 5. In other words, the carrier phase difference Δ21 is calculated using the above-described Formula 22, the carrier phase difference Δ21' using the first radio signal S1' is calculated by the following Formula 35.

$$\Delta 21' = \omega(t1c - t2c) \qquad \text{[Formula 35]}$$
$$= \Delta\phi 21' + \omega(t1b - t2b) - \Delta\omega f1(t1c - t1b) +$$
$$\Delta\omega f2(t2c - t2b)$$

In subsequent step 49, as the distance difference calculation process, using the carrier phase differences Δ21 and Δ21', the server 7 finds the distance difference πr12 which is a difference between a distance from the first fixed station 4 to the mobile station 2 and a distance from the second fixed station 5 to the mobile station 2. Note that, as illustrated in FIG. 19, assuming that a wave length of the first radio signal S1 is represented by $\lambda_1$, the distance difference $\pi r12$ which is an integral multiple of the wave length $\lambda_1$ is calculated every time the carrier phase difference $\Delta 21$ becomes $2\pi$. Additionally, assuming that a wave length of the first radio signal S1' is represented by $\lambda_2$, the distance difference $\pi r12$ which is an integral multiple of the wave length $\lambda_2$ is calculated every time the carrier phase difference $\Delta 21'$ becomes $2\pi$.

Figure 19:
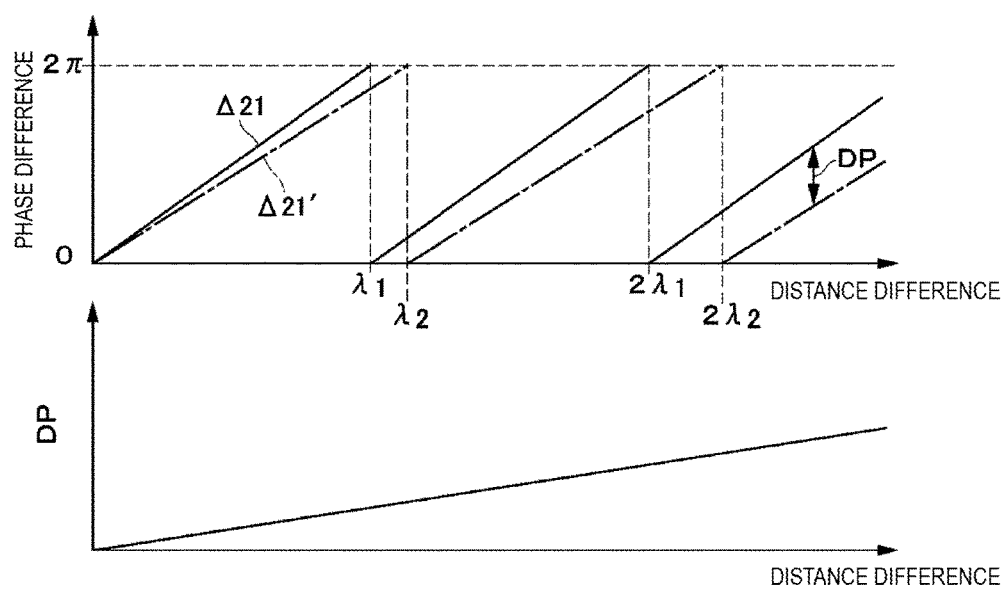
FIG. 19 includes descriptive diagrams illustrating a relationship among a carrier phase difference, a difference between the carrier phase differences, and a distance difference by a first radio signal according to the sixth embodiment.
Figure 20:
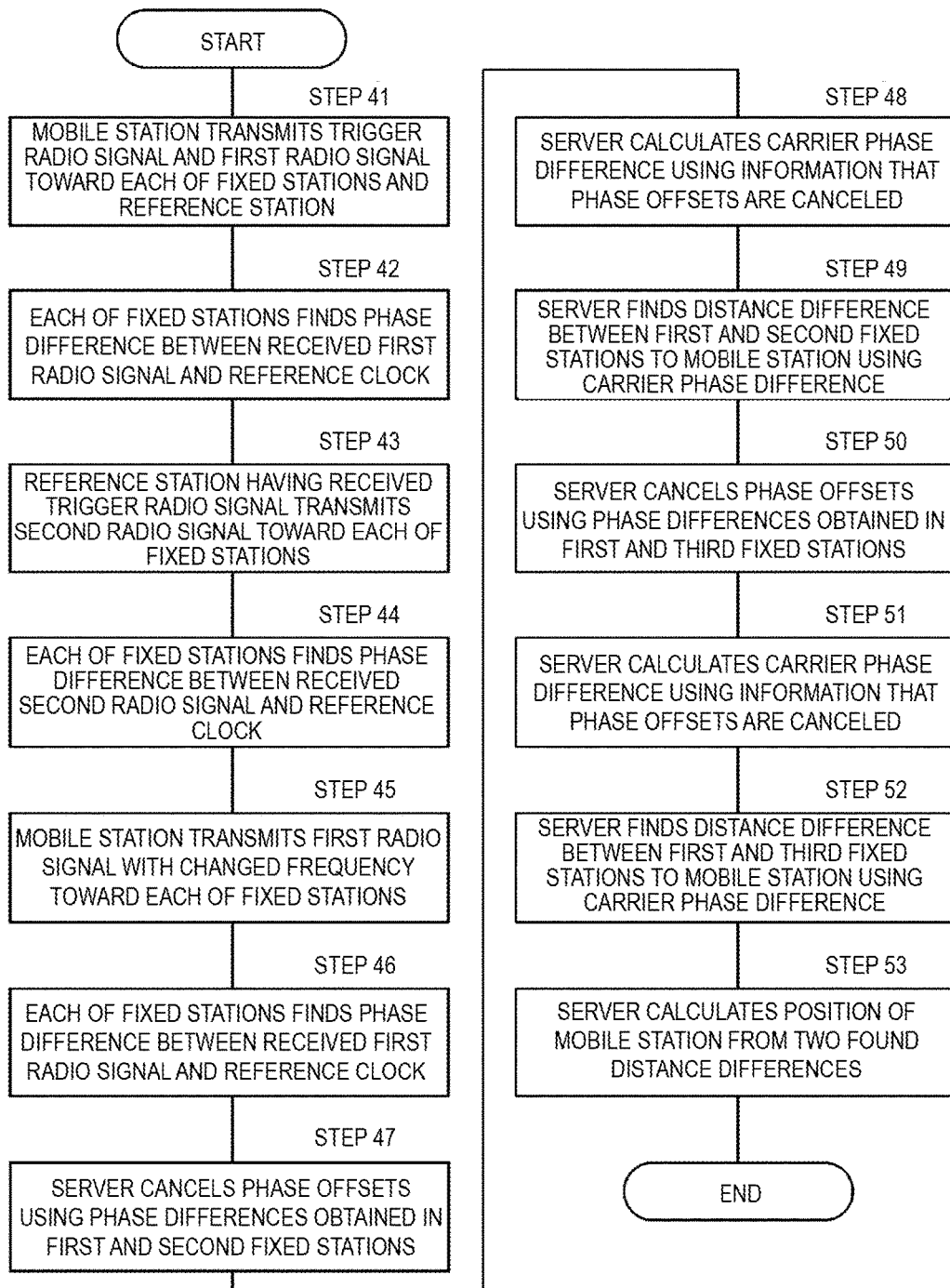
FIG. 20 is a flowchart illustrating an overall processing of the position detection system according to the sixth embodiment.

In this case, the carrier phase difference $\Delta 21$ and the carrier phase difference $\Delta 21'$ have different angular frequencies $\omega m$ and $\omega m'$ of the reference clocks Cm and Cm', respectively, which are repetition periods thereof, and thus, by using a difference DP ($=\Delta 21-\Delta 21'$) between the phase differences, it is possible to find how many times the carrier phase difference $\Delta 21$ and the carrier phase difference $\Delta 21'$ cycle (see FIG. 19). In other words, for example, in a case where the angular frequency $\omega m$ is 2.44 GHz, and the angular frequency $\omega m'$ is 2.45 GHz, the wave lengths $\lambda_1$ and $\lambda_2$ become 12.29 cm and 12.36 cm, respectively. Furthermore, the difference DP between the carrier phase differences $\Delta 21$ and $\Delta 21'$ is repeated every 30 m, if a range that the position detection system 51 can be compatible with is not more than 30 m, it is possible to uniquely find the carrier phase differences $\Delta 21$ and $\Delta 21'$.

Next, in step 50, as the phase offset cancel process, using the phase differences $\Delta\varphi mf1$, $\Delta\varphi sf1$, $\Delta\varphi mf1'$, $\Delta\varphi mf3$, $\Delta\varphi sf3$, and $\Delta\varphi mf3'$ obtained in the first and third fixed stations 4 and 6, the server 7 cancels the phase offsets $\varphi m$, $\varphi s$, $\varphi f1$, and $\varphi f3$ of the reference clocks Cm, Cs, Cf1, and Cf3 in the mobile station 2, the reference station 12, and the first and third fixed stations 4 and 6. In other words, the phase difference $\Delta\varphi 31$ is calculated using the above-described Formula 23, a phase difference $\Delta\varphi 31'$ is calculated using the following Formula 36.

$$\Delta\phi 31' = (\Delta\phi mf3' - \Delta\phi sf3) - (\Delta\phi mf1' - \Delta\phi sf1) \quad \text{[Formula 36]}$$
$$= \omega f1(t1c - t1b) - \omega f3(t3c - t3b)$$

In step 51, as the carrier phase difference calculation process, using the phase differences $\Delta\varphi 31$ and $\Delta\varphi 31'$ being information that the phase offsets $\varphi m$, $\varphi s$, $\varphi f1$, and $\varphi f3$ are canceled, the server 7 calculates the carrier phase differences $\Delta 31$ and $\Delta 31'$ between the first fixed station 4 and the third fixed station 6. In other words, the carrier phase difference $\Delta 31$ is calculated using the above-described Formula 24, the carrier phase difference 31' using the first radio signal S1' is calculated by the following Formula 37.

$$\Delta 31' = \omega(t1c - t3c) \quad \text{[Formula 37]}$$
$$= \Delta\phi 31' + \omega(t1b - t3b) - \Delta\omega f1(t1c - t1b) + \Delta\omega f3(t3c - t3b)$$

In subsequent step 52, as the distance difference calculation process, using the carrier phase differences $\Delta 31$ and $\Delta 31'$, the server 7 finds the distance difference $\Delta r13$ which is a difference between a distance from the first fixed station 4 to the mobile station 2 and a distance from the third fixed station 6 to the mobile station 2. In other words, finding a difference between the carrier phase difference $\Delta 31$ and the carrier phase difference $\Delta 31'$ in the same manner as when the distance difference $\pi r12$ is found makes it possible to uniquely find the carrier phase differences $\Delta 31$ and $\Delta 31'$.

In step 53, as the mobile station position calculation process, the server 7 calculates the position of the mobile station 2 from the two found distance differences $\Delta r12$ and $\Delta r13$. In other words, the server 7 can find the position of the mobile station 2 from a point of intersection of the hyperbola of the distance difference $\pi r12$ and the hyperbola of the distance difference $\Delta r13$.

As described above, almost the same actions and effects as those in the first embodiment can be obtained in the sixth embodiment as well. In the sixth embodiment, the configuration is such that the mobile station reference clock circuit 2A has the function for generating the reference clocks Cm and Cm' with two frequencies, the mobile station 2 transmits the first radio signals S1 and S1' with the two types of angular frequencies $\omega m$ and $\omega m'$. In this case, since the carrier phase difference $\Delta 21$ ($\Delta 31$) detected using one angular frequency $\omega m$ and the carrier phase difference $\Delta 21'$ ($\Delta 31'$) detected using the other angular frequency $\omega m'$ each have a different repetition period from each other, it is possible to find how many times the two carrier phase differences $\Delta 21$ and $\Delta 21'$ ($\Delta 31$ and $\Delta 31'$) cycle using the difference DP between the two carrier phase differences $\Delta 21$ and $\Delta 21'$ ($\Delta 31$ and $\Delta 31'$). With this, periodicity of the phase difference becomes long, uncertainty with respect to the phase is eliminated and an absolute phase can be found, and it is thus possible to calculate the position of the mobile station 2 with high accuracy.

Next, FIG. 1, FIG. 21, and FIG. 22 illustrate a position detection system according to a seventh embodiment of the present disclosure. A characteristic of the seventh embodiment is the configuration in which the reference station transmits second radio signals with two or more types of carrier frequencies. Note that, in the seventh embodiment, the same configuration as those in the first and second embodiments described above will be given the same reference numerals, and descriptions thereof will be omitted.

A position detection system 61 according to the seventh embodiment has almost the same configuration as that of the position detection system 11 according to the second embodiment. Accordingly, the position detection system 61 is configured by including the mobile station 2, the reference station 12, the first fixed station 4, the second fixed station 5, the third fixed station 6, the server 7, and the like.

Here, the reference station 12 transmits second radio signals S2 and S2' with two types of carrier frequencies (angular frequencies) toward each of the fixed stations 4 to 6. In this case, the reference station reference clock circuit 12A of the reference station 12 generates reference clocks Cs and Cs' with two frequencies. In other words, the reference station reference clock circuit 12A generates the reference clock Cs with an angular frequency $\omega s$ to be a reference of the second radio signal S2 and the reference clock Cs' with an angular frequency $\omega s'$ to be a reference of the second radio signal S2'. Note that, here, the angular frequency $\omega s$ of the second radio signal S2 is configured by the same angular frequency as the angular frequency $\omega m$ of the first radio signal S1 of the mobile station 2, the angular frequency $\omega s'$ of the second radio signal S2' is configured by the same angular frequency as the angular frequency $\omega m'$ of the first radio signal S1' of the mobile station 2.

Next, with reference to FIG. 21 and FIG. 22, a position detection method of the position detection system 61 according to the seventh embodiment will be described. Note that, in this case, step 61 to step 71 are executed instead of step 45 to step 53 of the sixth embodiment illustrated in FIG. 20. Other configurations are the same as those in the sixth embodiment illustrated in FIG. 20, and descriptions thereof will be omitted.

In step 61, the mobile station 2 transmits the first radio signal S1' with a different carrier frequency from that of the first radio signal S1 toward each of the fixed stations 4 to 6, and further transmits the trigger radio signal St' in order for the reference station 12 to transmit the second radio signal S2' (see FIG. 21). Here, the carrier phase Pm' of the first radio signal S1' that the mobile station 2 transmits at an instant of a time t0c is expressed by the above-described Formula 27.

In step 62, as the reference clock phase difference calculation process, the fixed stations 4 to 6 find the phase differences Δφmf1' to φmf3', respectively, between the carrier phase Pm' of the received first radio signal S1' and the phases Pf1 to Pf3 of the reference clocks Cf1 to Cf3 (see Formula 27 to Formula 33).

Next, in step 63, as the second radio signal transmission process, the reference station 12 which has received the trigger radio signal St' transmits the second radio signal S2' with a different carrier frequency from the second radio signal S2 toward each of the fixed stations 4 to 6. In other words, the reference station reference clock circuit 12A generates the reference clock Cs' with the angular frequency ωs' to be a reference of the second radio signal S2', transmits the second radio signal S2' through the transmission/reception antenna 12F. In this case, the reference station 12 which has received the trigger radio signal St' at a time tkc may transmit the second radio signal S2' after a predetermined period of time has passed. Additionally, the carrier phase Ps' of the second radio signal S2' transmitted by the reference station 12 at a time t0d is expressed by the following Formula 38.

$$Ps'=\omega s't0d+\phi s \quad \text{[Formula 38]}$$

In step 64, as the reference clock phase difference calculation process, the fixed stations 4 to 6 find the phase differences Δφsf1' to φsf3', respectively, between the carrier phase Ps' of the received second radio signal S2' and the phases Pf1 to Pf3 of the reference clocks Cf1 to Cf3. In other words, assuming that a time when the first fixed station 4 receives the second radio signal S2' is represented by t1d, the phase Pf1 of the reference clock Cf1 is expressed by the following Formula 39, the phase difference Δφsf1' between the carrier phase Ps' of the second radio signal S2' and the phase Pf1 of the reference clock Cf1 is expressed by the following Formula 40.

$$Pf1=\omega f1 t1d+\phi f1 \quad \text{[Formula 39]}$$

$$\Delta \phi sf1'=Ps'-Pf1=\omega s't0d-\omega f1 t1d+\phi s-\phi f1 \quad \text{[Formula 40]}$$

In the same manner, assuming that a time when the second fixed station 5 receives the second radio signal S2' is represented by t2d, the phase Pf2 of the reference clock Cf2 is expressed by the following Formula 41, the phase difference Δφsf2' between the carrier phase Ps' of the second radio signal S2' and the phase Pf2 of the reference clock Cf2 is expressed by the following Formula 42.

$$Pf2=\omega f2 t2d+\phi f2 \quad \text{[Formula 41]}$$

$$\Delta \phi sf=Ps'-Pf2=\omega s't0d-\omega f2 t2d+\phi s-\phi f2 \quad \text{[Formula 42]}$$

In the same manner, assuming that a time when the third fixed station 6 receives the second radio signal S2' is represented by t3d, the phase Pf3 of the reference clock Cf3 is expressed by the following Formula 43, the phase difference Δφsf3' between the carrier phase Ps' of the second radio signal S2' and the phase Pf3 of the reference clock Cf3 is expressed by the following Formula 44.

$$Pf3=\omega f3 t3d+\phi f3 \quad \text{[Formula 43]}$$

$$\Delta \phi sf3'=Ps'-Pf3=\omega s't0d-\omega f3 t3d+\phi s-\phi f3 \quad \text{[Formula 44]}$$

Next, in step 65, as the phase offset cancel process, using the phase differences Δφmf1, Δφsf1, Δφmf1', Δφsf1', Δφmf2, Δφsf2, Δφmf2', and Δφsf2' obtained in the first and second fixed stations 4 and 5, the server 7 cancels the phase offsets φm, φs, φf1, and φf2 of the reference clocks Cm, Cs, Cf1, and Cf2 in the mobile station 2, the reference station 12, and the first and second fixed stations 4 and 5. In other words, the phase difference Δφ21 is calculated using the above-described Formula 20, a phase difference Δφ21" is calculated using the following Formula 45.

$$\Delta \phi 21'' = (\Delta \phi sf 2' - \Delta \phi mf 2') - (\Delta \phi sf 1' - \Delta \phi mf 1') \quad \text{[Formula 45]}$$
$$= \omega f2(t2c - t2d) - \omega f1(t1c - t1d)$$

In step 66, as the carrier phase difference calculation process, using the phase differences Δφ21 and Δφ21" being information that the phase offsets φm, φs, φf1, and φf2 are canceled, and the server 7 calculates the carrier phase differences Δ21 and Δ21" between the first fixed station 4 and the second fixed station 5. In other words, the carrier phase difference Δ21 is calculated using the above-described Formula 22, the carrier phase difference Δ21" using the second radio signal S2' is calculated by the following Formula 46.

$$\Delta 21'' = \omega(t2c - t1c) \quad \text{[Formula 46]}$$
$$= \Delta \phi 21'' + \omega(t2d - t1d) + \Delta \omega f1(t1c - t1d) -$$
$$\Delta \omega f2(t2c - t2d)$$

In subsequent step 67, as the distance difference calculation process, using the carrier phase differences Δ21 and Δ21", the server 7 finds the distance difference πr12 which is a difference between a distance from the first fixed station 4 to the mobile station 2 and a distance from the second fixed station 5 to the mobile station 2. In this case, the carrier phase difference Δ21 and the carrier phase difference Δ21" have different angular frequencies ωm and ωm' of the reference clocks Cm and Cm', respectively, which are repetition periods thereof, and thus, by using the difference (=Δ21−Δ21") between the phase differences, it is possible to uniquely find the carrier phase differences Δ21 and 421".

Next, in step 68, as the phase offset cancel process, using the phase differences Δφmf1, Δφsf1, Δφmf1', Δφsf1', Δφmf3, Δφsf3, Δφmf3', and Δφsf3' obtained in the first and third fixed stations 4 and 6, the server 7 cancels the phase offsets φm, φs, φf1, and φf3 of the reference clocks Cm, Cs, Cf1, and Cf3 in the mobile station 2, the reference station 12, and the first and third fixed stations 4 and 6. In other words, the phase difference Δφ31 is calculated using the above-described Formula 23, a phase difference Δφ31" is calculated using the following Formula 47.

$$\Delta \phi 31'' = (\Delta \phi sf 3' - \Delta \phi mf 3') - (\Delta \phi sf 1' - \Delta \phi mf 1') \quad \text{[Formula 47]}$$
$$= \omega f3(t3c - t3d) - \omega f1(t1c - t1d)$$

In step 69, as the carrier phase difference calculation process, using the phase differences $\Delta\varphi 31$ and $\Delta\varphi 31''$ being information that the phase offsets $\varphi m$, $\varphi s$, $\varphi f1$, and $\varphi f3$ are canceled, and the server 7 calculates the carrier phase differences $\Delta 31$ and $\Delta 31''$ between the first fixed station 4 and the third fixed station 6. In other words, the carrier phase difference $\Delta 31$ is calculated using the above-described Formula 24, the carrier phase difference $\Delta 31''$ using the second radio signal S2' is calculated by the following Formula 48.

$$\Delta 31'' = \omega(t3c - t1c) \quad \text{[Formula 48]}$$
$$= \Delta\phi 31'' + \omega(t3d - t1d) + \Delta\omega f1(t1c - t1d) -$$
$$\Delta\omega f3(t3c - t3d)$$

In subsequent step 70, as the distance difference calculation process, using the carrier phase differences $\Delta 31$ and $\Delta 31''$, the server 7 finds the distance difference $\Delta r13$ which is a difference between a distance from the first fixed station 4 to the mobile station 2 and a distance from the third fixed station 6 to the mobile station 2. In this case, the carrier phase difference $\Delta 31$ and the carrier phase difference $\Delta 31''$ have different angular frequencies $\omega m$ and $\omega m'$ of the reference clocks Cm and Cm', respectively, which are repetition periods thereof, and thus, by using the difference ($=\Delta 31-\Delta 31''$) between the phase differences, it is possible to uniquely find the carrier phase differences $\Delta 31$ and $\Delta 31''$.

In step 71, as the mobile station position calculation process, the server 7 calculates the position of the mobile station 2 from the two found distance differences $\Delta r12$ and $\Delta r13$. In other words, the server 7 can find the position of the mobile station 2 from a point of intersection of the hyperbola of the distance difference $\pi r12$ and the hyperbola of the distance difference $\Delta r13$.

As described above, almost the same actions and effects as those in the first embodiment can be obtained in the seventh embodiment as well. In the seventh embodiment, the configuration is such that the reference station 12 transmits the second radio signals S2 and S2' with the two types of angular frequencies $\omega s$ and $\omega s'$ which are the same as those of the mobile station 2. With this configuration, by using the carrier phase differences $\Delta 31$ and $\Delta 31''$ of the two angular frequencies $\omega s$ and $\omega s'$, periodicity of the phase difference becomes long, the distance differences $\Delta r12$ and $\Delta r13$ of the mobile station 2 to each of the fixed stations 4 to 6 can be uniquely found. Additionally, performing a phase correction using the first radio signals S1 and S1' with the two types of angular frequencies $\omega m$ and $\omega m'$ by the mobile station 2 and the second radio signals S2 and S2' with the two types of angular frequencies $\omega s$ and $\omega s'$ by the reference station 12 makes it possible to enhance accuracy of the phase correction and calculate the position of the mobile station 2 with high accuracy.

Note that, the first embodiment is configured such that the position detection system 1 includes three fixed stations 4 to 6. However, the present disclosure is not limited thereto, may be configured such that the position detection system includes four or more fixed stations. This also applies to the second to seventh embodiments.

Furthermore, the first embodiment is configured such that, after the mobile station 2 transmits the first radio signal S1, the reference station 3 transmits the second radio signal S2. However, the present disclosure is not limited thereto, may be configured such that, after the reference station transmits the second radio signal, the mobile station transmits the first radio signal.

Furthermore, the first embodiment is configured such that the server 7 finds the position of the mobile station 2 from the point of intersection of the hyperbola of the distance difference $\Delta r12$ between distances between the mobile station to the first fixed station 4 and to the second fixed station 5 and the hyperbola of the distance difference $\Delta r13$ between distances between the mobile station to the first fixed station 4 and to the third fixed station 6. However, the present disclosure is not limited thereto, may be configured such that the server further finds a hyperbola of a distance difference $\Delta r23$ ($=r2-r3$) between distances between the mobile station to the second fixed station and to the third fixed station, and finds the position of the mobile station from the three hyperbolas of the distance differences $\Delta r12$, $\Delta r13$, and $\Delta r23$.

Furthermore, the first embodiment is configured such that the position detection system 1 includes one mobile station 2. However, the present disclosure is not limited thereto, may be configured such that the position detection system includes two or more mobile stations. In this case, for example, the configuration may be such that an ID information is added to the first radio signal transmitted by the mobile station to identify an individual. This also applies to the second to seventh embodiments.

Furthermore, the third embodiment is configured such that the mobile station reference clock circuit 2A and the reference station reference clock circuit 3A generate the reference clocks Cm and Cs with the same angular frequency as those of the respective fixed station reference clock circuits 4A to 6A. However, the present disclosure is not limited thereto, may be configured such that at least one of the mobile station reference clock circuit and the reference station reference clock circuit generates the reference clock with the same angular frequency as those of the respective fixed station reference clock circuits 4A to 6A.

Furthermore, the fifth embodiment is configured such that the first fixed station 42 also includes the function of the reference station and transmits the second radio signal S2 toward each of the fixed stations 5 and 6. However, the present disclosure is not limited thereto, may be configured such that the second fixed station or the third fixed station also includes the function of the reference station and transmits the second radio signal. Additionally, the configuration may be such that two or more fixed stations among the fixed stations also include the function of the reference station and transmit the second radio signal.

Furthermore, the sixth embodiment is configured such that the mobile station reference clock circuit 2A has the function for generating the reference clocks Cm and Cm' with the two angular frequencies $\omega m$ and $\omega m'$, and the mobile station transmits the two types of first radio signals S1 and S1'. However, the present disclosure is not limited thereto, may be configured such that the mobile station reference clock circuit generates reference clocks with three or more angular frequencies, and the mobile station transmits three or more types of first radio signals. This also applies to the seventh embodiment.

Furthermore, the seventh embodiment is configured such that the carrier phase differences $\Delta 21$ and $\Delta 31$ are found using the first radio signal S1 and the second radio signal S2, the carrier phase differences $\Delta 21''$ and $\Delta 31''$ are found using the first radio signal S1' and the second radio signal S2'. However, the present disclosure is not limited thereto, the carrier phase difference may be found using the first radio signal S1 and the second radio signal S2'. Additionally, the carrier phase difference may be found using the first radio signal S1' and the second radio signal S2.

Furthermore, the seventh embodiment is configured such that the reference station reference clock circuit 12A has the function for generating the reference clocks Cs and Cs' with the two angular frequencies ωs and ωs', and the reference station transmits the two types of second radio signals S2 and S2'. However, the present disclosure is not limited thereto, may be configured such that the reference station reference clock circuit generates reference clocks with three or more angular frequencies, and the reference station transmits three or more types of second radio signals.

1, 11, 21, 31, 41, 51, 61 POSITION DETECTION SYSTEM
2 MOBILE STATION
2A MOBILE STATION REFERENCE CLOCK CIRCUIT
2C, 3C, 12C, 42C RADIO SIGNAL TRANSMISSION CIRCUIT
2D, 3D, 4D, 5D, 6D TRANSMISSION ANTENNA
3, 12 REFERENCE STATION
3A, 12A REFERENCE STATION REFERENCE CLOCK CIRCUIT
4, 42 FIRST FIXED STATION
4A, 5A, 6A, 42A FIXED STATION REFERENCE CLOCK CIRCUIT
4C, 5C, 6C, 12D, 42D RADIO SIGNAL RECEPTION CIRCUIT
5 SECOND FIXED STATION
6 THIRD FIXED STATION
12F, 42F TRANSMISSION/RECEPTION ANTENNA

The invention claimed is:

1. A position detection system comprising:
a mobile station having a mobile station reference clock circuit, a radio signal transmission circuit, and a transmission antenna;
a reference station having a reference station reference clock circuit, a radio signal transmission circuit, and a transmission antenna; and
at least three or more fixed stations each having a fixed station reference clock circuit, a radio signal reception circuit, and a reception antenna, wherein
the fixed station reference clock circuits of the three or more fixed stations each asynchronously and independently operate and generate reference clocks with same frequency as one another,
the mobile station intermittently transmits at least one first radio signal based on a reference clock of the mobile station reference clock circuit,
the reference station is disposed at a predetermined position and intermittently transmits at least one second radio signal based on a reference clock of the reference station reference clock circuit,
each of the fixed stations receives the first radio signal and extracts a phase difference between a carrier included in the first radio signal and each of the reference clocks of each of the fixed stations, receives the second radio signal and extracts a phase difference between a carrier included in the second radio signal and each of the reference clocks of each of the fixed stations,
a phase offset of the reference clock of each of the fixed stations is canceled using phase difference information between the mobile station and each of the fixed stations and phase difference information between the reference station and each of the fixed stations, distance information between each of the fixed stations and the mobile station is obtained, and a position of the mobile station is calculated.

2. The position detection system according to claim 1, wherein
the mobile station transmits a trigger radio signal in order for the reference station to transmit the second radio signal,
the reference station has a radio signal reception circuit and a reception antenna, and
the reference station transmits the second radio signal when receiving the trigger radio signal transmitted by the mobile station.

3. The position detection system according to claim 1, wherein
at least one of the mobile station reference clock circuit of the mobile station and the reference station reference clock circuit of the reference station generates a reference clock with the same frequency as a frequency of each of the fixed station reference clock circuits of each of the fixed stations.

4. The position detection system according to claim 2, wherein
the mobile station transmits the trigger radio signal and the first radio signal with a predetermined time gap.

5. The position detection system according to claim 1, wherein
at least one fixed station of the three or more fixed stations also includes a function of the reference station and transmits the second radio signal.

6. The position detection system according to claim 1, wherein
the mobile station reference clock circuit of the mobile station has a function of generating reference clocks with two or more frequencies, and
the mobile station transmits the first radio signals with two or more types of carrier frequencies.

7. The position detection system according to claim 6, wherein
the reference station transmits the second radio signals with two or more types of carrier frequencies being the same as the carrier frequencies of the mobile station.

8. A position detection method using a position detection system,
the position detection system including:
a mobile station having a mobile station reference clock circuit, a radio signal transmission circuit, and a transmission antenna;
a reference station having a reference station reference clock circuit, a radio signal transmission circuit, and a transmission antenna; and
at least three or more fixed stations each having a fixed station reference clock circuit, a radio signal reception circuit, and a reception antenna,
the position detection method comprising:
asynchronously and independently operating each of the fixed station reference clock circuits of the three or more fixed stations to generate reference clocks with same frequency as one another;
intermittently transmitting at least one first radio signal based on a reference clock of the mobile station reference clock circuit in the mobile station;
disposing the reference station at a predetermined position and intermittently transmitting at least one second radio signal based on a reference clock of the reference station reference clock circuit;

in each of the fixed stations, receiving the first radio signal and extracting a phase difference between a carrier included in the first radio signal and each of the reference clocks of each of the fixed stations, receiving the second radio signal and extracting a phase difference between a carrier included in the second radio signal and each of the reference clocks of each of the fixed stations; and canceling a phase offset of the reference clock of each of the fixed stations using phase difference information between the mobile station and each of the fixed stations and phase difference information between the reference station and each of the fixed stations, obtaining distance information between each of the fixed stations and the mobile station, and calculating a position of the mobile station.

9. The position detection method according to claim 8, wherein the mobile station transmits a trigger radio signal in order for the reference station to transmit the second radio signal, the reference station has a radio signal reception circuit and a reception antenna, and the reference station transmits the second radio signal when receiving the trigger radio signal transmitted by the mobile station.

10. The position detection method according to claim 8, wherein at least one of the mobile station reference clock circuit of the mobile station and the reference station reference clock circuit of the reference station generates a reference clock with the same frequency as a frequency of each of the fixed station reference clock circuits of each of the fixed stations.

11. The position detection method according to claim 9, wherein the mobile station transmits the trigger radio signal and the first radio signal with a predetermined time gap.

12. The position detection method according to claim 8, wherein at least one fixed station of the three or more fixed stations also includes a function of the reference station and transmits the second radio signal.

13. The position detection method according to claim 8, wherein the mobile station reference clock circuit of the mobile station has a function of generating reference clocks with two or more frequencies, and the mobile station transmits the first radio signals with two or more types of carrier frequencies.

14. The position detection method according to claim 13, wherein the reference station transmits the second radio signals with two or more types of carrier frequencies being the same as the carrier frequencies of the mobile station.

* * * * *